Figure 1:
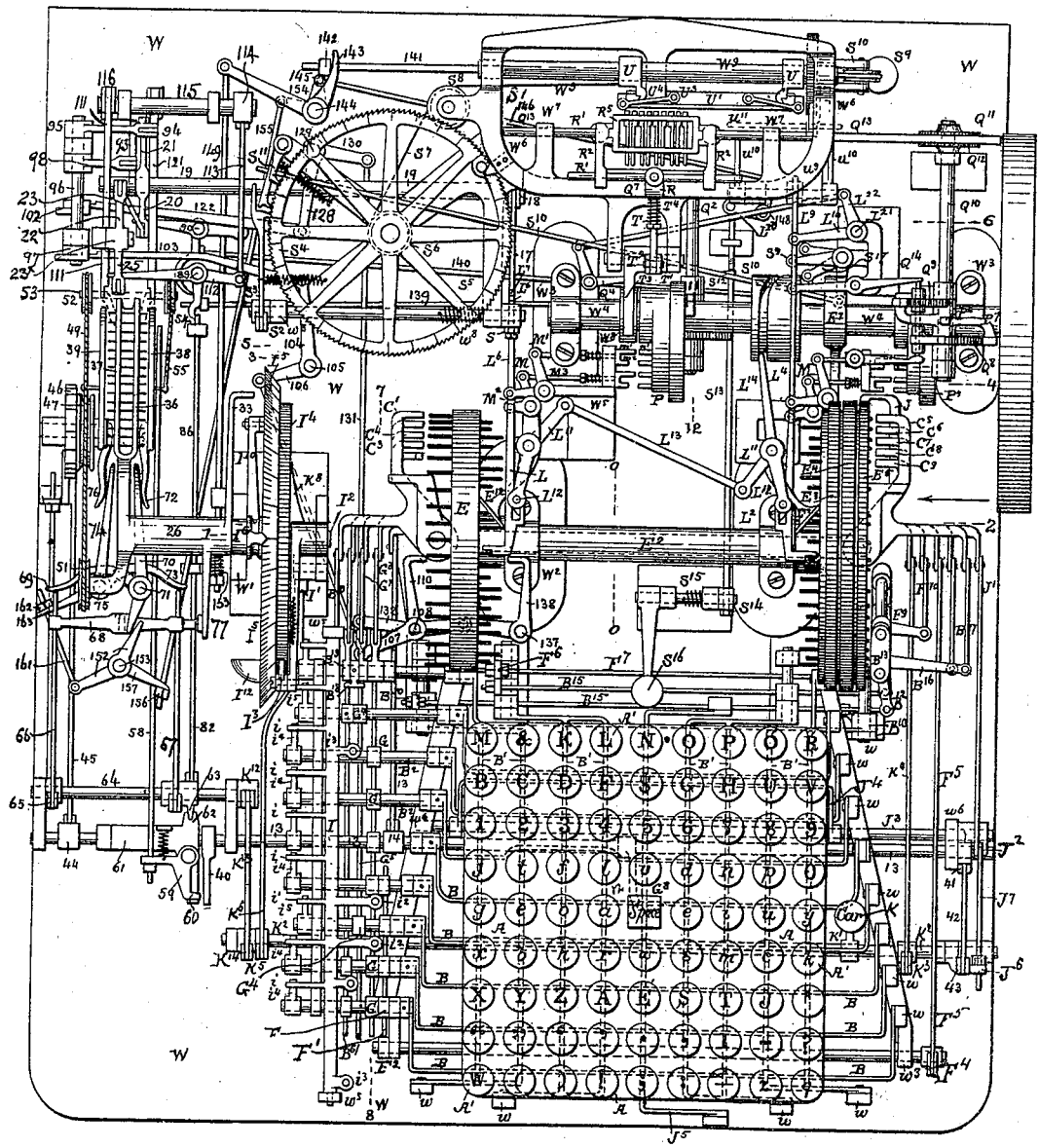

No. 620,183. Patented Feb. 28, 1899.
I. RISLEY & V. F. LAKE.
TYPOGRAPHIC MACHINE.
(Application filed Aug. 6, 1892.)

(No Model.) 14 Sheets—Sheet 1.

Witnesses:

Inventors
Isaac Risley &
Vincent F. Lake
by their Attorneys

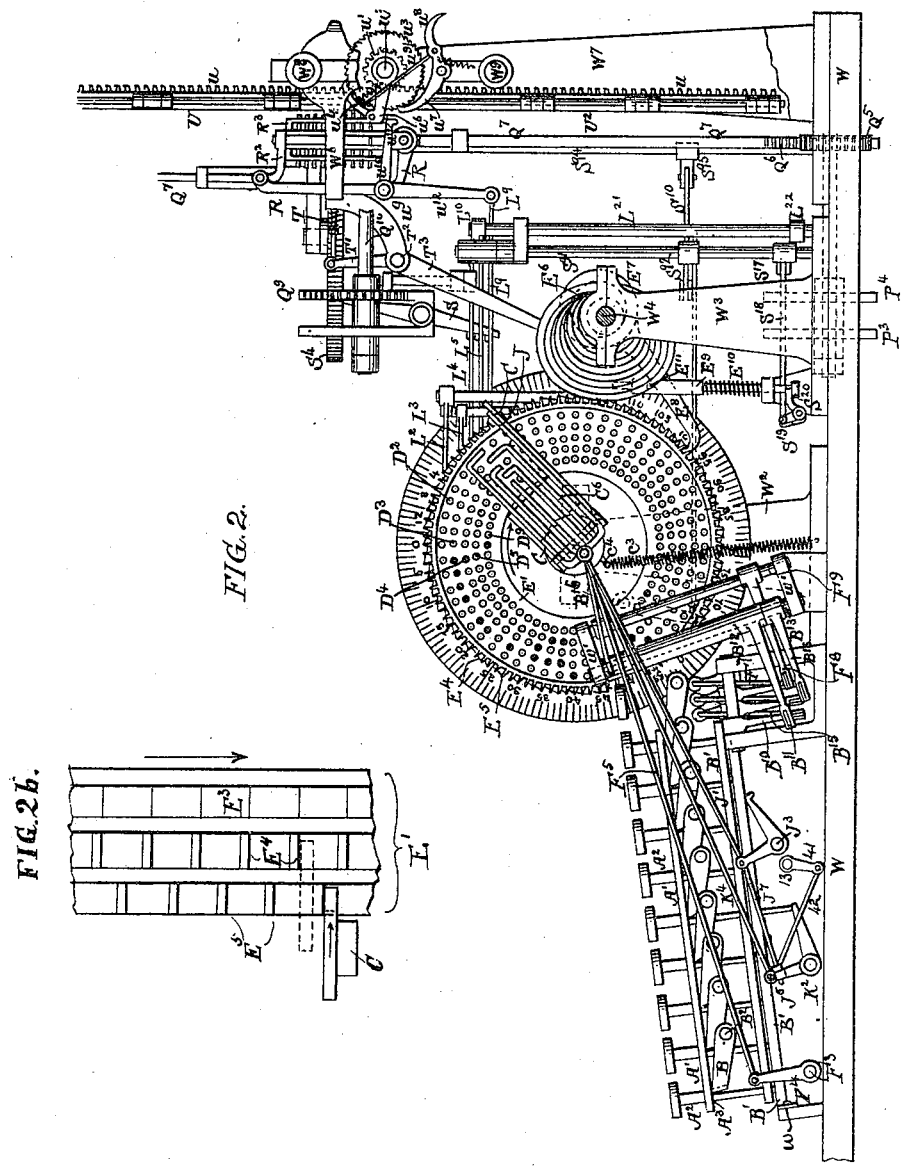

No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 3.
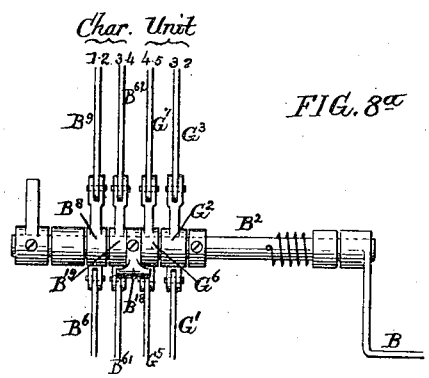
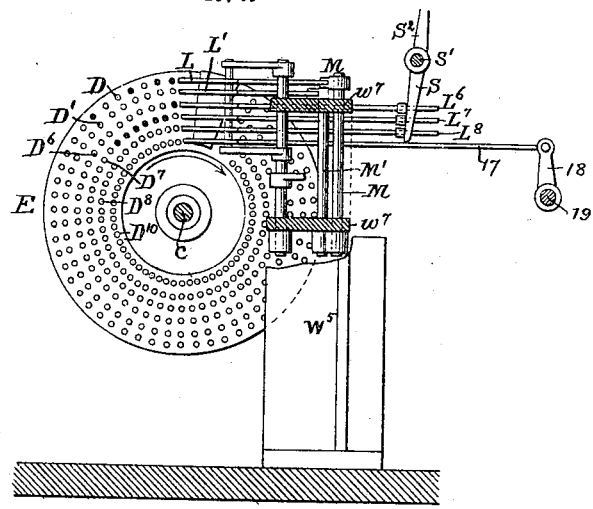
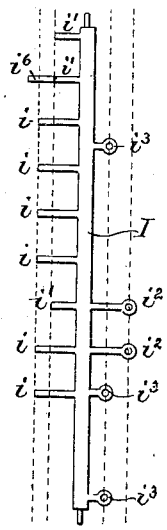
Witnesses:
Inventors:
Isaac Risley &
Vincent F. Lake
by their Attorneys
Howson & Howson No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 4.
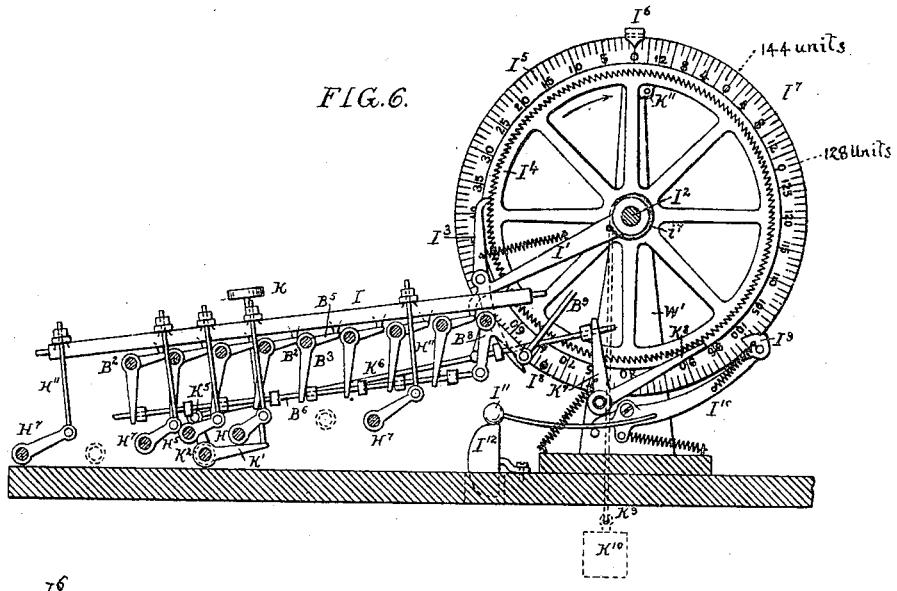
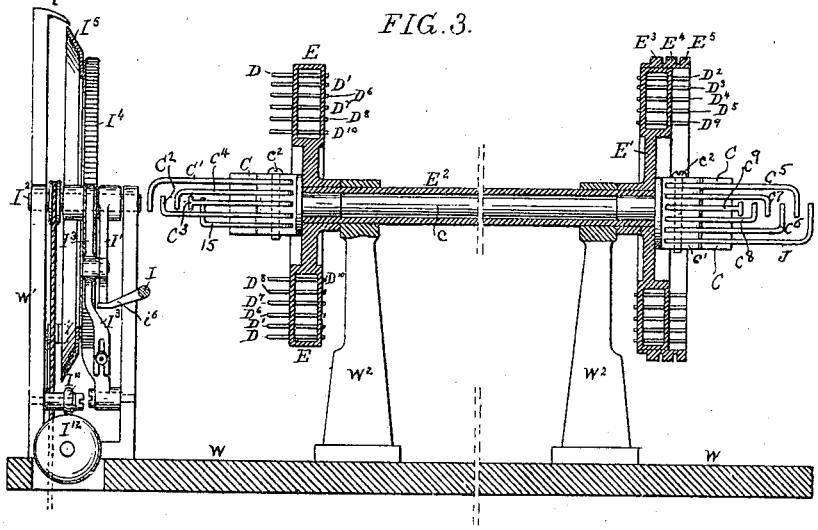
Witnesses:
A. V. Groups
G. L. Goodwin
Inventors:
Isaac Risley &
Vincent F. Lake
by their Attorneys
Howson & Howson No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 5.
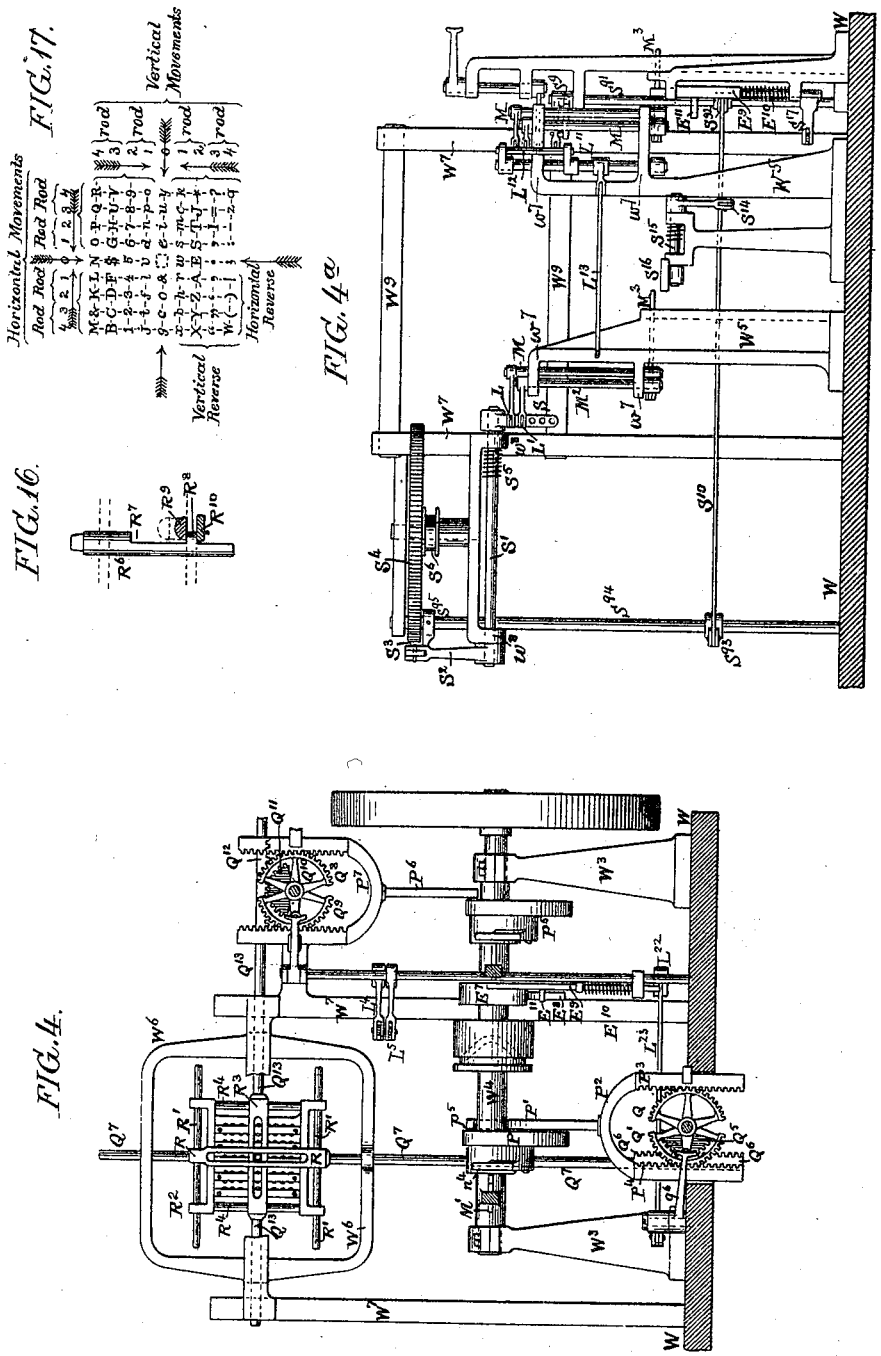
Witnesses:
Inventors:
Isaac Risley &
Vincent F. Lake
by his Attorneys

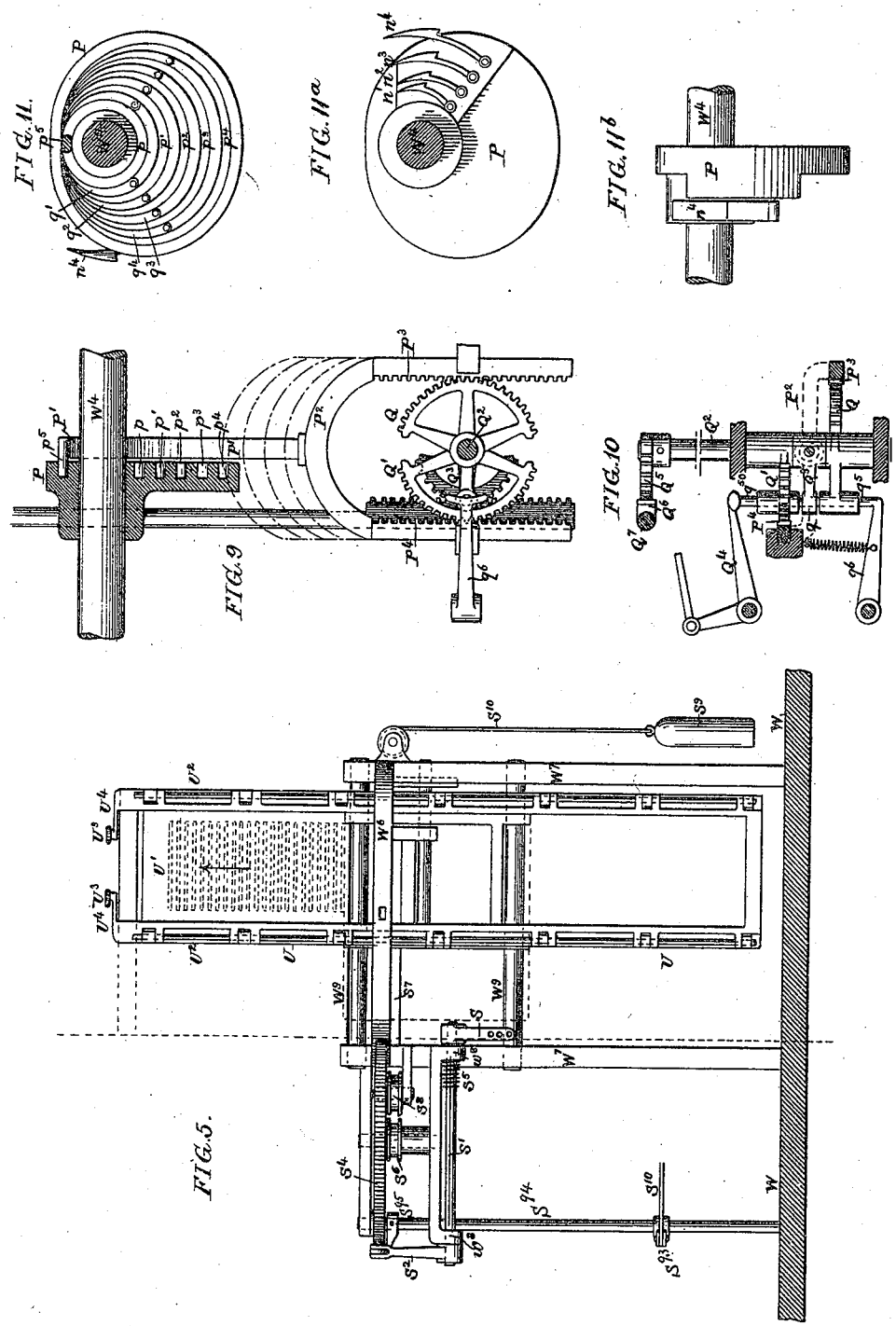

No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 8.
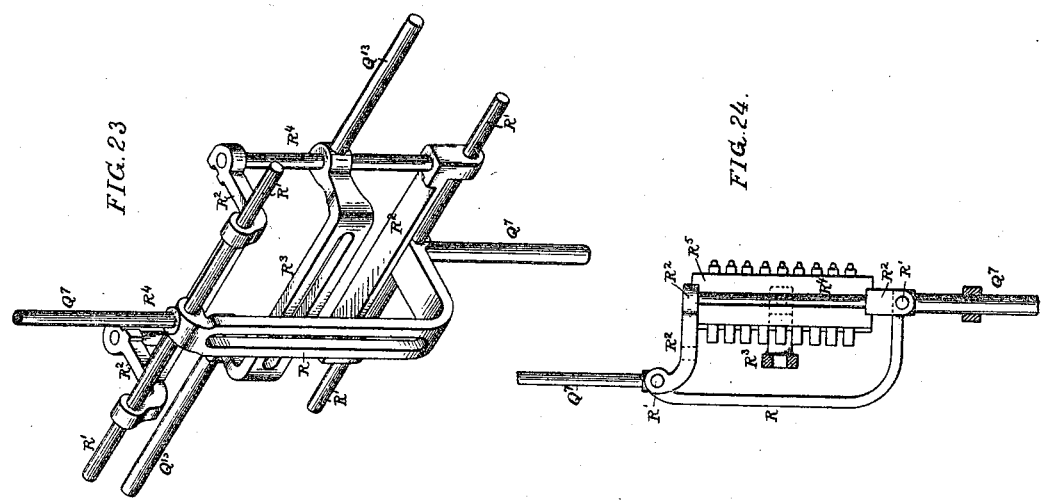
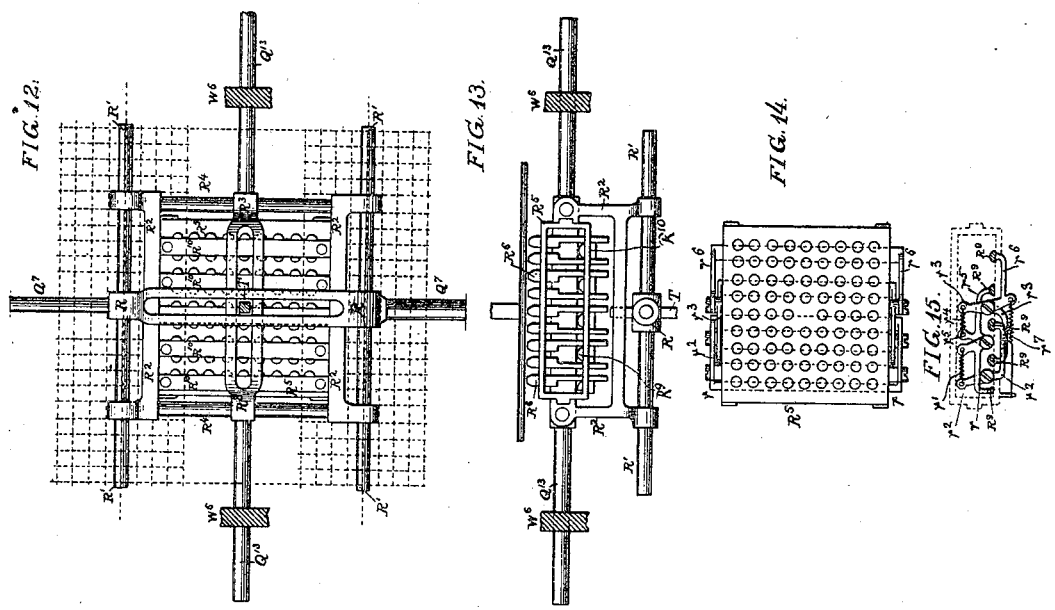
Witnesses:
Inventors
Isaac Risley &
Vincent F. Lake
by their Attorneys
Howson & Howson No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 9.
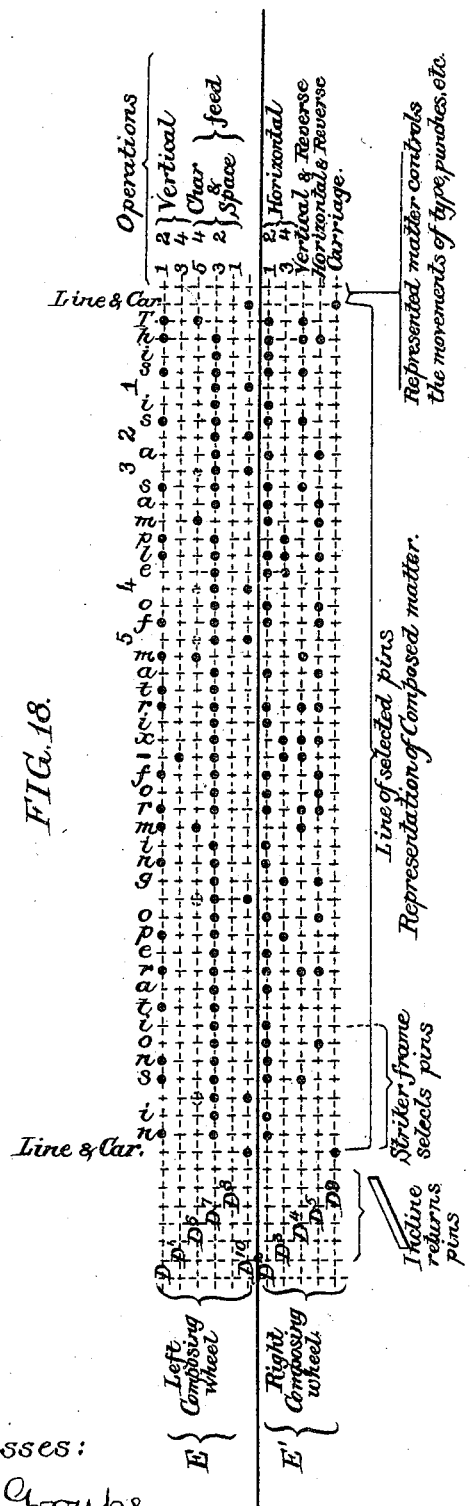
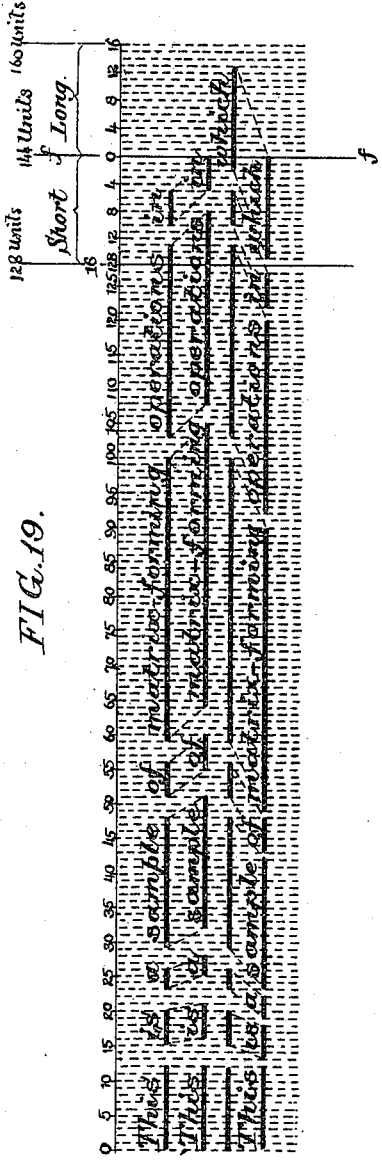
Witnesses:
A. V. Groupe
F. D. Goodwin
Inventors:
Isaac Risley &
Vincent F. Lake
by their Attorneys No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 10.

Witnesses:
Inventors:
Isaac Risley &
Vincent F. Lake
by their Attorneys

No. 620,183. Patented Feb. 28, 1899.
I. RISLEY & V. F. LAKE.
TYPOGRAPHIC MACHINE.
(Application filed Aug. 6, 1892.)

(No Model.) 14 Sheets—Sheet 11.

Witnesses
Inventors
Isaac Risley &
Vincent F. Lake
by their Attorneys

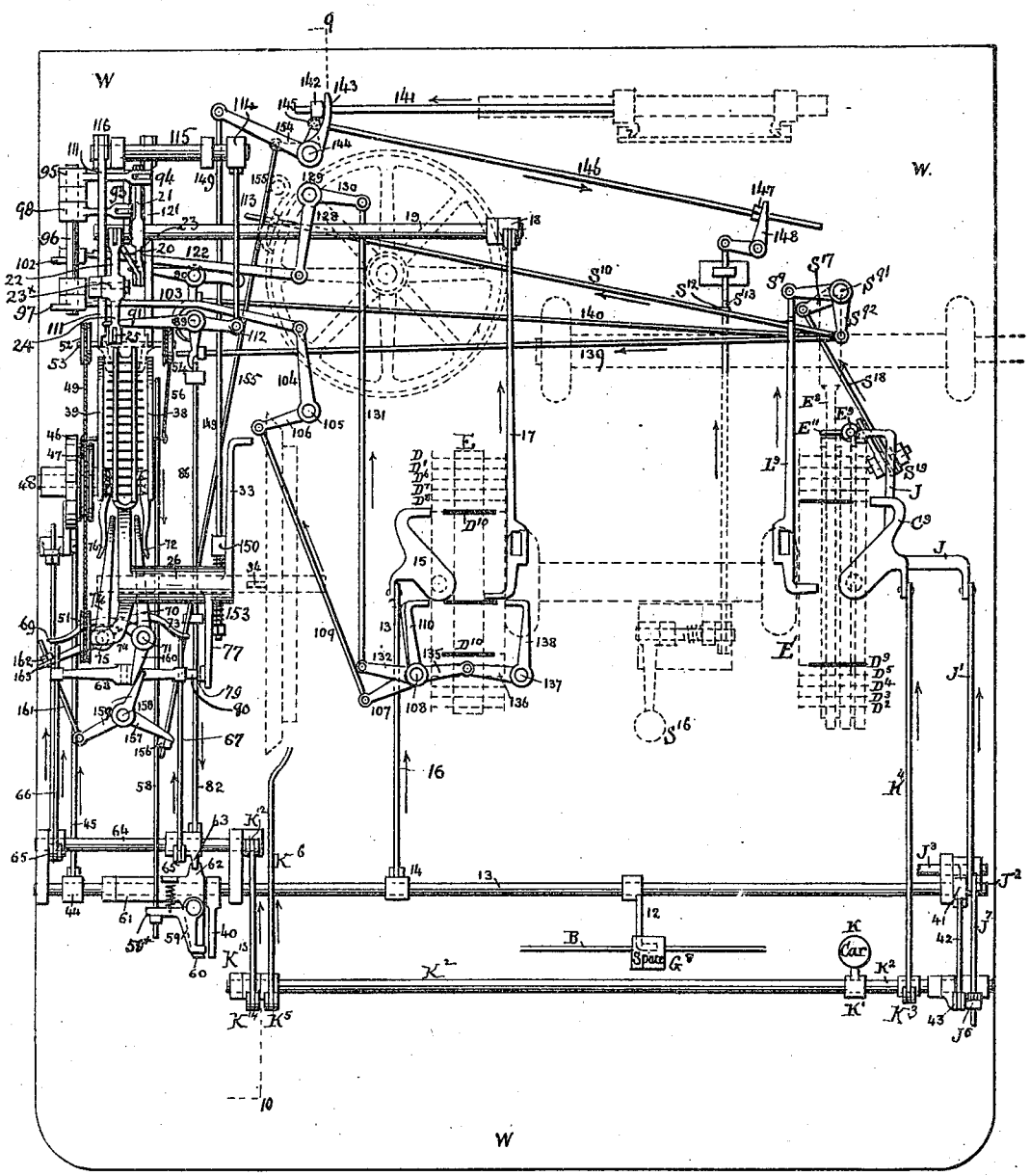

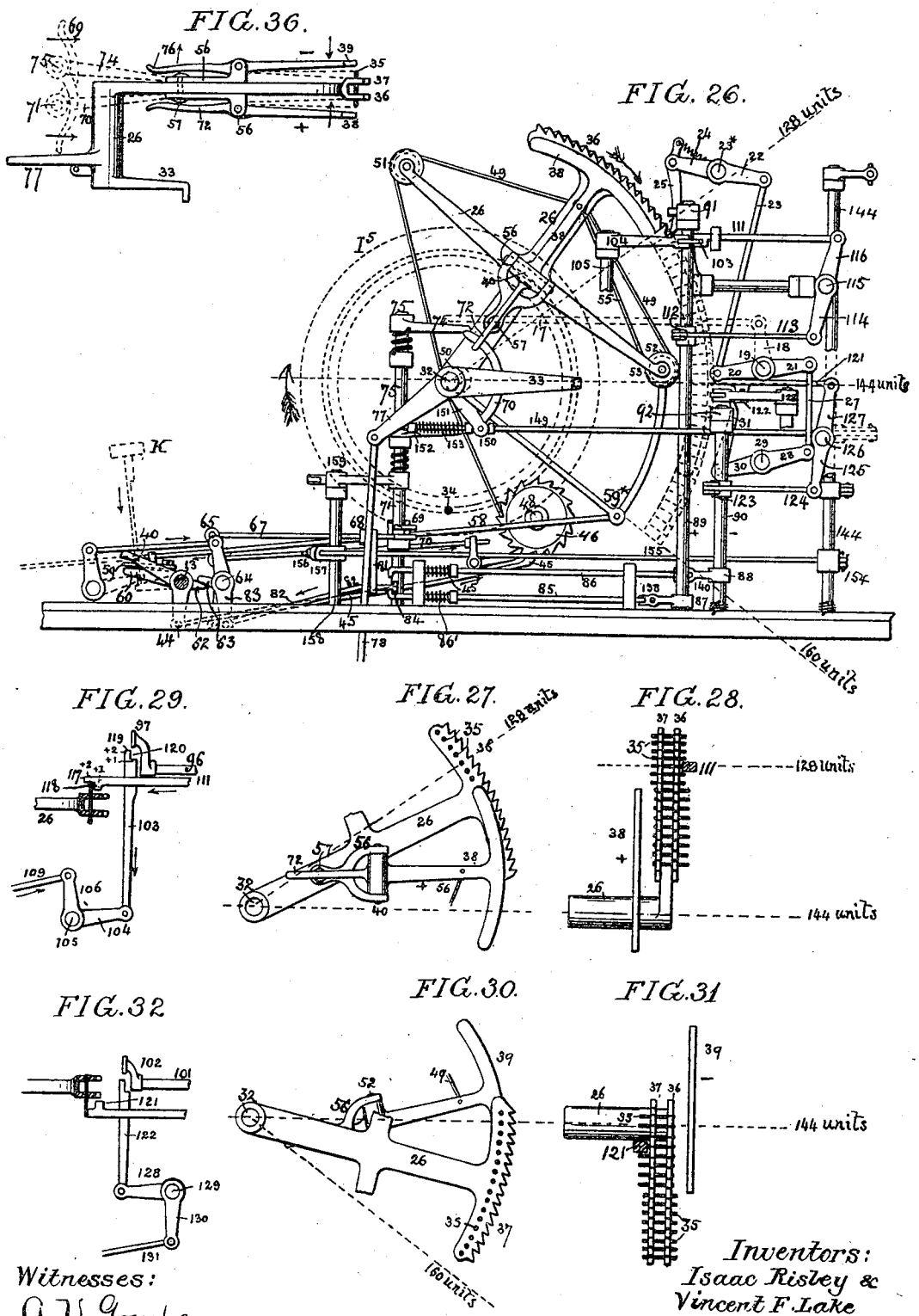

No. 620,183. Patented Feb. 28, 1899.
I. RISLEY & V. F. LAKE.
TYPOGRAPHIC MACHINE.
(Application filed Aug. 6, 1892.)
(No Model.) 14 Sheets—Sheet 14.
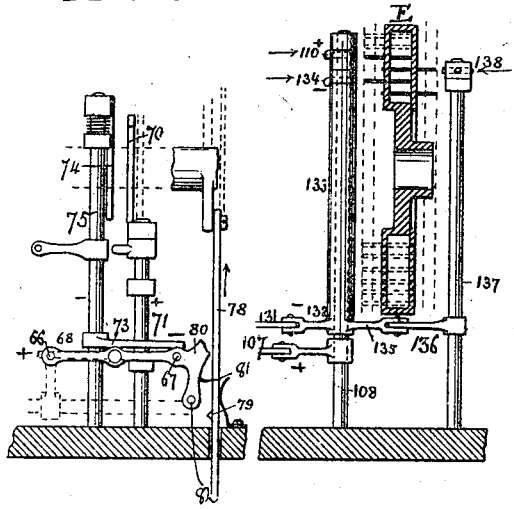
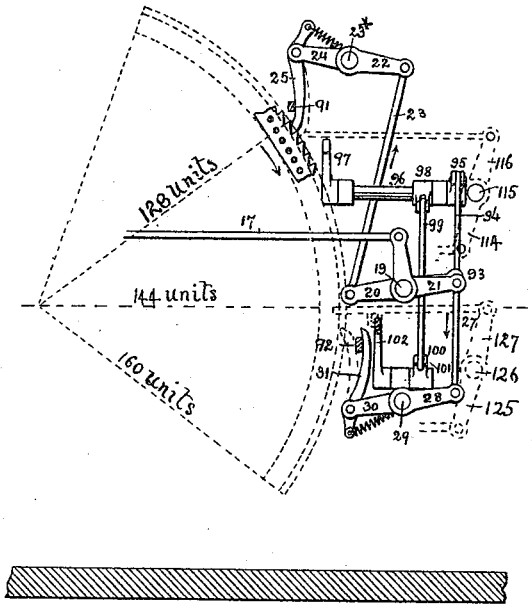
Witnesses:
Inventors:
Isaac Risley &
Vincent F. Lake
by their Attorneys
Howson & Howson

UNITED STATES PATENT OFFICE.

ISAAC RISLEY AND VINCENT F. LAKE, OF PLEASANTVILLE, NEW JERSEY, ASSIGNORS, BY MESNE ASSIGNMENTS, TO JOSEPH H. BORTON, TRUSTEE.

TYPOGRAPHIC MACHINE.

SPECIFICATION forming part of Letters Patent No. 620,183, dated February 28, 1899.

Application filed August 6, 1892. Serial No. 442,334. (No model.)

*To all whom it may concern:*

Be it known that we, ISAAC RISLEY and VINCENT F. LAKE, citizens of the United States, and residents of Pleasantville, Atlantic county, New Jersey, have invented certain Improvements in Typographic Machines, of which the following is a specification.

Our present invention is in the nature of an improvement upon the invention of a machine for typographic purposes forming the subject of the Letters Patent No. 588,087, dated August 10, 1897, granted to Isaac Risley.

One of the important features of improvement consists in the provision of means whereby the justification of the line governed by the unit record or register is effected by automatic means. It should be understood, however, that many features of our present invention are applicable to and can be employed in typographic machines in which the justification in the final representation or final impression is not effected automatically.

A further important feature of our present invention consists in means for automatically closing the line of matter composed.

As in the Risley invention, our present machine is shown as embodying a keyboard mechanism or composing-action, means for producing a preliminary representation, and means for measuring the matter forming a line or recording or registering the units to govern the final justified representation in the word-spaces which are also registered. In the machine specifically illustrated in the Risley patent punched paper is shown as employed for the preliminary representation, whereas in the machine illustrated in this application movable pieces or pins held frictionally in wheels or disks are employed for the purpose. In the machine illustrated in the Risley patent the means for producing the final impression or representation consisted of mechanism in the nature of a type-writer, whereas the machine herein specifically illustrated and described is primarily designed for matrix-making and employs a matrix-carriage, impressing mechanism, and means for successively locating the different punches of the different characters to be successively impressed upon the matrix. Our improvements are not, however, limited to matrix-making machines, but are also applicable in the main to other typographic machines, such as type-casting, type-setting, or type-writing machines.

Figure 7:
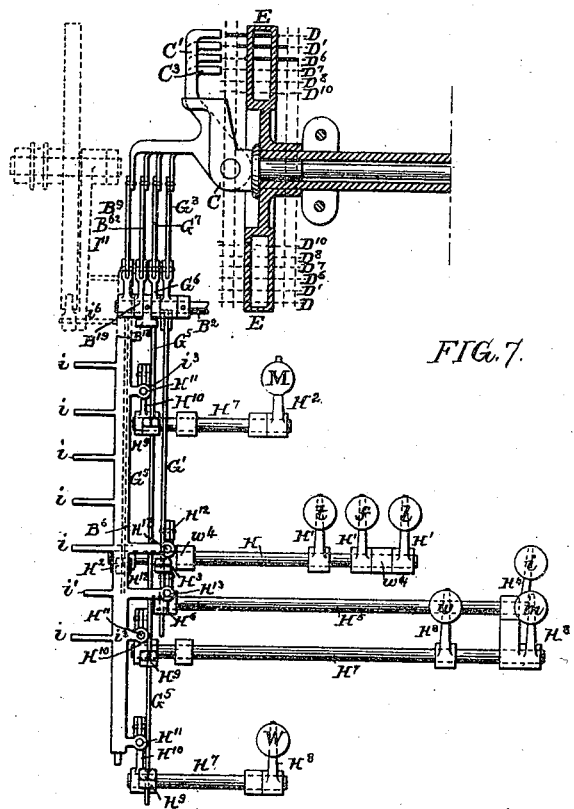
Figure 8:
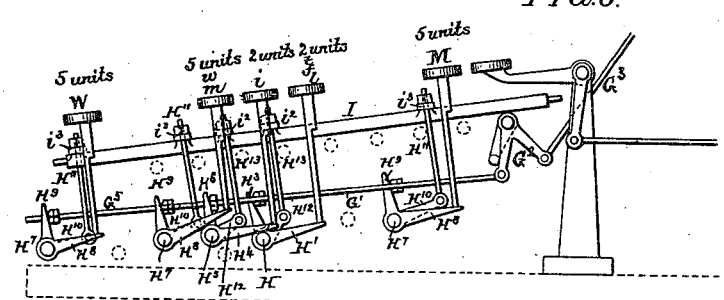
Figure 20:
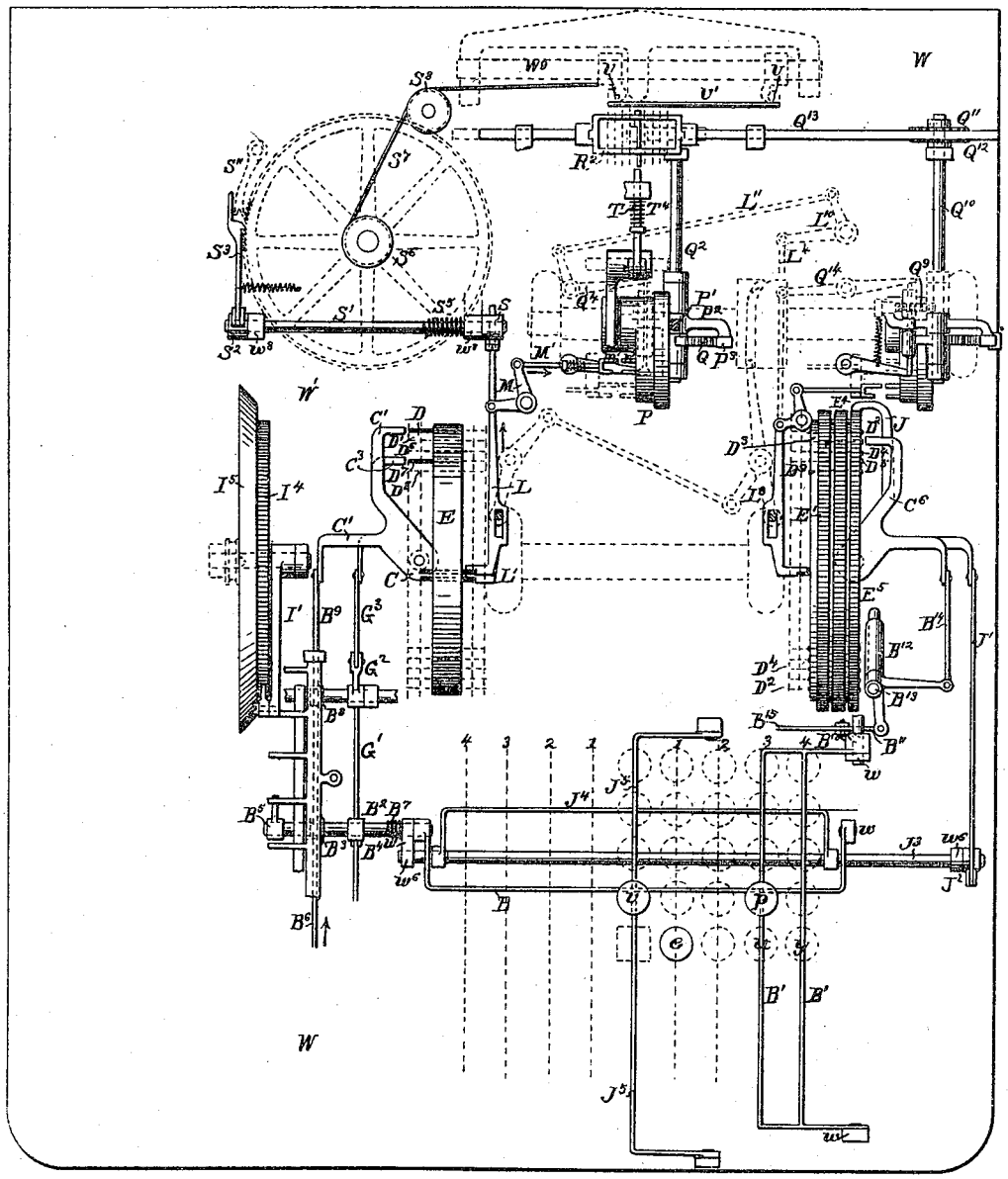
Figure 21:
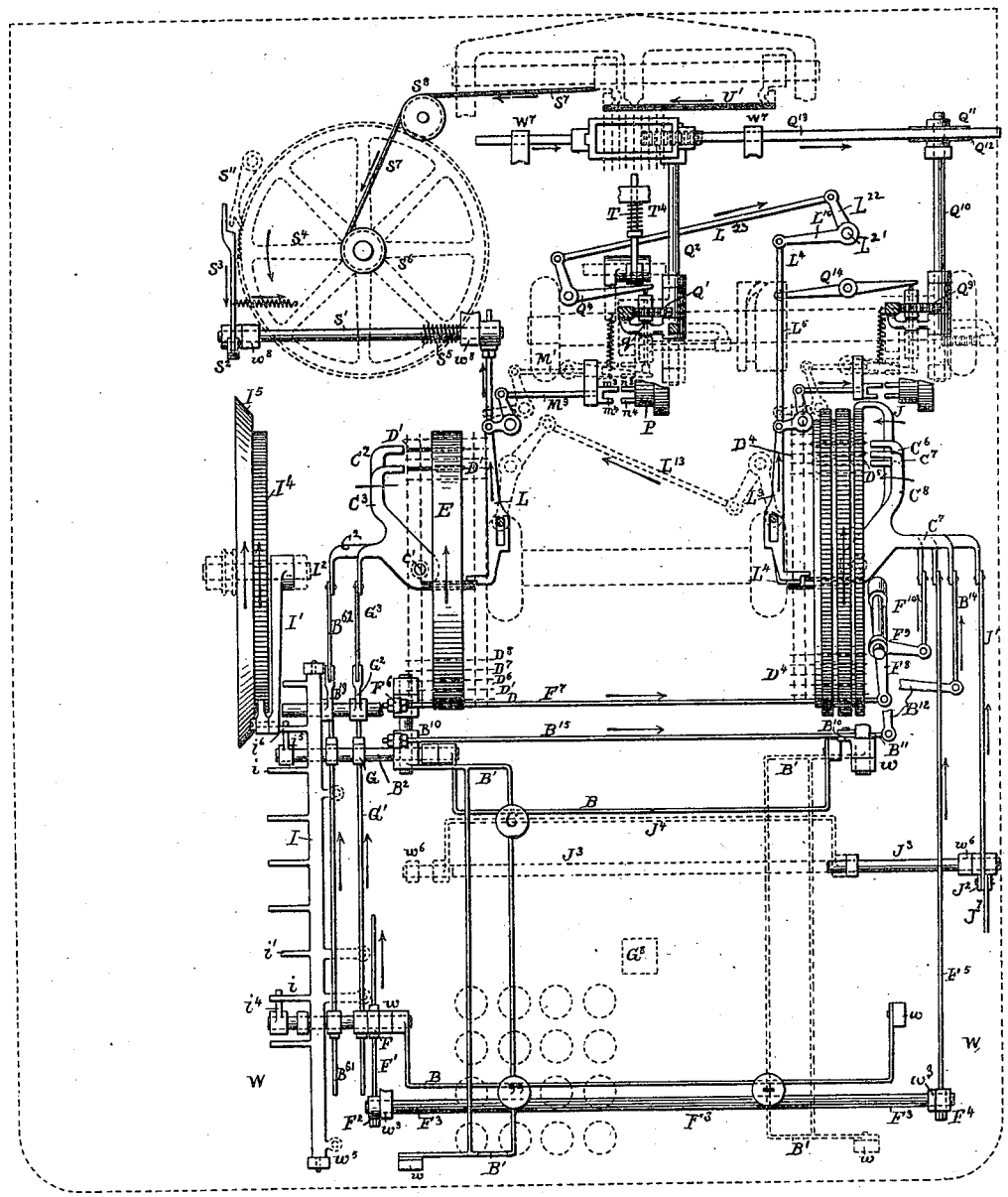

In the accompanying drawings, Figure 1 is a plan view of the machine, illustrating our invention. Fig. 2 is a side view, looking in the direction of the arrow, Fig. 1. Fig. 2ª is a longitudinal sectional view on the line O O, Fig. 1. Fig 2ᵇ is a view, drawn to an enlarged scale, of a part of the escapement for the right-hand pin-wheel. Fig. 3 is a transverse sectional view on the line 1 2, Fig. 1. Fig. 4 is a transverse sectional view on the line 3 4, Fig. 1. Fig. 4ª is a transverse sectional view on the line 5 6, Fig. 1. Fig. 5 is a transverse sectional view of the matrix-carriage frame. Fig. 6 is an enlarged sectional view on the line 7 8, Fig. 1. Fig. 7 is a plan view in detail showing a number of the keys and their connections, the balance of the keyboard being removed to avoid confusion. In this view certain parts are shown, which for the sake of clearness have been omitted from Fig. 1. Fig. 8 is a side view of Fig. 7. Fig. 8ª is an enlarged plan view of a portion of Fig. 7. Fig. 9 is a view of the vertical character-locating mechanism. Fig. 10 is a plan view of Fig. 9. Fig. 11 is a side view of the vertical locating-cam, being a section on the line 11 12, Fig. 1. Fig. 11ª is a view of the back of the locating-cam. Fig. 11ᵇ is a sectional view of the locating-cam. Fig. 12 is an enlarged detailed elevation of the punch-carrier. Fig. 13 is a plan view of Fig. 12. Fig. 14 is a view of the punch-frame which forms part of the punch-carrier. Fig. 15 is a plan view of Fig. 14. Fig. 16 is a view showing one of the matrix-punches. Fig. 17 is a diagram showing the arrangement of the keys on the keyboard and the arrangement of the matrix-punches in the punch-carrier. Fig. 18 is a diagram illustrating a line of composition upon the character-representing mechanism. Fig. 19 is a diagram illustrating the registration of the matter composed, as in Fig. 18, upon the unit composition-register and illustrating the matter after it has been justified by the automatic mechanism. Figs. 20 and 21 are skeleton plan views showing the connections between the character-keys and the punch-carrier, the automatic justifying mechanism being omitted in these views. Fig. 22 is a diagram of the unit-register feed rock-shaft. Fig. 23 is a perspective view of the punch-carrier frame. Fig. 24 is a side view of the punch-carrier. Fig. 25 is a skeleton plan view illustrating the automatic justifying mechanism. Fig. 26 is a sectional elevation on the line 9 10, Fig. 25. Figs. 27, 28, and 29 are diagrams illustrating the justifying-arm and its connections when in the "plus" position. Figs. 30, 31, and 32 are diagrams illustrating the justifying-arm and its connection when in a "minus" position. Figs. 33, 34, and 35 are sectional elevations, similar to Fig. 26, with parts removed to illustrate more clearly certain details of the mechanism. Fig. 36 is a detached plan view of the justifying-arm. Figs. 37 and 38 are sectional views of details hereinafter referred to.

In order to simplify the description of the parts and the operation of our improved machine, we have used the following terms to designate different sections of the machine, and the word "action" found in the specification is the same as used when referring to the action of a piano. We will take the terms up in the order that they appear in the description:

First, the composing-action: This includes the keyboard, the keys, the strikers for projecting the pins upon the pin-wheels, and the lever mechanism between the keys and the strikers.

Second, the character-representing mechanism: This in the present instance is shown as a shaft on which are two pin-wheels having concentric series of holes in which are suitable pins which can be projected by the strikers alluded to above. The shaft carrying the wheels is given a positive intermittent forward feed by a feed-pawl, which, however, is thrown into and out of gear by intervening mechanism controlled by the keys.

Third, the space-representing mechanism: This mechanism consists of a number of rows of pins upon one of the pin-wheels. In the present instance there are three rows of pins indicating five-unit measurements. We would state that each character of our machine has for its space occupied upon the matrix-sheet a predetermined number of units, as two units for the narrow characters—such as "f," "l," and "i"—three units for such characters as "e" and "s," four units for such letters as "a," "b," and "d," five units for the letters "m," "W," and "M," &c.; and that the above-mentioned rows of pins are used to represent the unit widths of said characters, and in addition a space between words. We invariably represent from composition at the keyboard a word-space of three-units width, which is increased or diminished, if necessary, by the justifying mechanism, which will project certain pins or depress the three-unit-space pins to lengthen or shorten the composed line prior to impression upon the matrix-sheet.

Fourth, the unit composition-register: This consists of a dial, a pointer, a signal and a connection with the keyboard, so that every stroke upon the keys by the operator will indicate upon the register the number of units that the character or word space occupies. This mechanism acts upon the automatic justifying mechanism when the dial has reached a certain point, and the dial also indicates the number of units in a line. The automatic justifying mechanism, however, justifies the line.

Fifth, the character-locating mechanism: This includes the mechanism acted upon by the character-representing pins for locating the individual character-punches in proper position to be impressed into the matrix-sheet, and consists of a power-shaft having upon it two multiple cams, each operating an independent traveler, and switch mechanism acted upon by the character-pins, by which the traveler of each cam is directed into a given groove, the travelers being so geared to the character-punch carrier that one cam will give the vertical movements to the carrier and the other cam will give the lateral movements to the carrier. Thus any character-punch can be located either by the single movement of one of these travelers or by the combined movement of the two.

Sixth, the automatic justifying mechanism, which includes the justifying-arm, the mechanism for feeding said arm forward, devices for uncovering the pins carried by the arms, the mechanism controlled by the pins, the strikers and their connections by which the pins on the pin-wheel are readjusted, so as to add or subtract the number of units sufficient to justify the line, the line in the present instance being one hundred and forty-four units in length.

Seventh, the impressing mechanism: This simply consists in the present instance of a plunger having intermittent motion, which acts upon the selected character-punch to force it into the matrix-sheet.

Eighth, the matrix-carrier: This consists of a frame upon which the matrix-sheet is mounted being given a justified unit-space movement and an intermittent line movement.

Ninth, the matrix-carrier feed: This includes mechanism for giving the proper unit movement to the matrix-sheet, and in the present instance consists of a ratchet-wheel having at least as many teeth as there are units in the justified line and lever mechanism for acting upon the ratchet-wheel, this lever mechanism being in turn acted upon by the projected unit-space pins.

Tenth, the line-closing or carriage-return movement: This line-closing may be effected either from a key provided for the purpose or may be effected automatically on the operation of the word-space key in the last word-space of the line. The mechanism comprises a striker, a row of representing-pins and lever mechanism between the said pins, and the check and feed pawls for the matrix-carrier, so that when the key is depressed it projects a pin, which in turn acts upon the lever mechanism, which forces the check and feed pawls out of gear with the ratchet-wheel, allowing the weight to return the matrix-carrier to its normal position—that is, to the beginning of a new line—and at the same time it acts upon the line-feed mechanism to feed the matrix one line and holds certain parts of the automatic justifying mechanism out of gear until the carriage is returned, when the parts are released and the feed-pawl thrown into gear, ready to commence a new line.

In describing the details of our invention we will, as much as possible, set forth the details of each section as described above, so as to simplify the description.

In order to give a clear understanding of the operation and object of our invention, we will now refer to the diagrams Figs. 18 and 19.

Fig. 18 is a diagram representing by intersecting lines the different rows of pins on the pin-wheels and the black spots representing projected pins. In the present instance the left representing pin-wheel has two rows of character-representing pins for vertically moving the punch-carrier, three rows of unit and space pins, and one row termed the "special" space-pin row. The machine is so arranged that the smallest space is the one-unit space and the largest space a five-unit space; but it will be evident that the space-units may be increased in number without departing from our invention. We may in some instances use five rows of character and space unit-pins projecting the pins one distance; but in order to economize space in construction we reduce it to three rows, the first row representing one unit, and by pushing the pins of the second row half-way out two units are represented, and by pushing the same pins out the full distance three units are represented. When the third-row pins are projected one-half the distance, four units are represented, and if these pins are projected the full distance five units are represented, and it will be understood that the normal word-space is three units, and this word-space can be contracted to one or two units, or it can be increased to four or five units.

It will be readily understood that where it is desired to have but one distance movement of the representation-pins it is simply necessary to increase the number of rows of pins and to operate them by means similar to those used for operating the one-distance-movement pins hereinafter referred to.

We would state here that while we have shown and described the five-unit measurement it will be understood that a machine may be made to embody more or less units, according to the unit division of the character. On the right representing-wheel we have two rows of character-representing pins for horizontally moving the punch-carrier. The third row of representing-pins gives a horizontal reverse movement to the punch-carrier, and the fourth row gives a reverse vertical movement to the punch-carrier.

We would state here in order to avoid confusion hereinafter that by arranging the punch-carrier as shown, so that the punches always come to the center to press the matrix-sheet, we use clutching mechanism for moving the carrier, one set of clutching mechanism being used for the vertical movement, and one set of clutching mechanism being used for the horizontal movement, and we so arrange the mechanism that one face of each clutch is normally in gear. In the present instance the two clutch-faces, one for giving the downward motion to the carrier and the other for giving the left-hand horizontal motion, are normally in gear, and when it is required to give the upward motion or a right-hand horizontal movement the clutches that are normally out of gear are thrown into gear by the projected pins on the third and fourth pin rows of the right-hand representing-wheel. The fifth row of pins on the right-hand representing-wheel operate mechanism to return the matrix-carrier to its normal position to begin a new line. We have shown projected pins in this line, the first pin representing the completion of a prior line, and the second pin represents the completion of the line shown represented in the diagram.

Before describing our method of justifying the matter set up we will refer to Fig. 19, which is a diagram in which each unit of feed is represented. The normal length of line we have indicated as one hundred and forty-four units; but we operate a signal when we reach one hundred and twenty-eight units or sixteen units short of the predetermined standard line, thus leaving sixteen units in which to complete the line. Now if it happens that when the signal is given we have a word that cannot be completed within the sixteen units above mentioned we are at liberty to run beyond the one hundred and forty-fourth unit-line a certain number of units, in the present instance sixteen. We have shown in this diagram four sets of lines representing examples, the first representing a line falling short of the predetermined number of units, (one hundred and forty-four,) the second the former line justified, and the third line representing the matter extending beyond the predetermined number of units, and the fourth the third line justified. It will be understood that this condition only occurs on the representing pin-wheel and on the unit-registering dial and that the first line is identical with the matter represented by the black pins. (Shown in Fig. 18.) It will be noticed in referring again to Fig. 19 that the line is five units short. Consequently five units will have to be added to the word-spaces within the line. In the present composition there are seven word-spaces. Therefore we need only add one unit to each of five of these word-spaces to complete the line. As will be seen, the second line in the diagram illustrates the completion of this line of matter by adding one unit to each of the last five word-spaces.

Before proceeding to describe an instance where the matter composed extends beyond the given number of units we will turn to the diagram Fig. 18. The shaded rows of pins in said diagram indicate the four unit-pins projected opposite the five word-spaces mentioned above, thus adding one unit to three unit-pins already projected on the fourth row, so that when the matter is transferred to the matrix-sheet the word-space instead of being three units in length, as originally represented by the operator, will be four units in length, increasing the line as many units as the line was short. Thus the matter terminates at a given point of one hundred and forty-four units when impressed.

Turning now to the third line of the diagram Fig. 19, we have an instance in which the line composed is longer than the predetermined line of one hundred and forty-four units. We therefore contract the word-spaces by pushing in all of the three-unit-word-space pins and projecting one-unit-space pin and three two-unit, making a deduction of thirteen units in the full line, which will bring the line to the predetermined standard of one hundred and forty-four units.

We would state here that the line very seldom falls short more than a few units or overruns more than a few units. We have shown an extreme case by inserting the word "which" in the diagram Fig. 19.

We will now describe in detail the composing-action, referring particularly to Figs. 1, 2, 3, 6, 7, and 8.

The composing-action, as will be understood, comprises a keyboard, the levers and strikers which act upon the pins on the pin-wheel, and the mechanism for operating the register-dial. Referring first to the keyboard, Figs. 1 and 17, it will be noticed that some of the letters are arranged on a vertical central line and some on a horizontal central line, these two lines crossing each other at the center of the keyboard, at which point we provide the space-key. These vertical and horizontal lines divide the keyboard into four sections, as shown in the diagram Fig. 17, and this arrangement is duplicated on the punch-carrier, the punches being arranged identically in the same manner as the keys upon the keyboard, and as the punch-carrier is mounted vertically on the machine we have deemed it best to use the terms "vertical" and "horizontal" in referring to the keyboard, so as to avoid confusion. The impressing mechanism is arranged directly opposite the center space on the punch-carrier, so that all the characters have to be brought to this point by certain movements, some plain and some compound, in order to be impressed into the matrix-sheet. All the characters on the central vertical line need only be moved in a vertical direction, while all the characters on the central horizontal line need be moved only in a horizontal direction; but the characters in the four blocks of sections have not only a vertical motion, but also a horizontal motion, as will be readily understood when we refer more particularly to the details of the punch-carrier and to the mechanism for operating the same.

Mounted upon the base-frame W of the machine is the keyboard A, Fig. 1, which can be constructed in any suitable manner to allow of the free movement of the keys A' to operate upon the lever mechanism. The key A' is composed of a vertical round stem A², Fig. 2, with the lower portion reduced at one side, so as to form a shoulder A³, under which rests one of the transverse levers B, which extend from one side of the keyboard to the other and are journaled in bearings w. A depression of any of the transverse levers B, with the exception of the central lever, which is placed in position not for the purpose of moving the punch-carrier, but for the purpose of operating the unit composition-register and operating the space-representing mechanism, will initiate the movements which finally control the vertical movements of the punch-carrier.

It will be understood that the transverse levers B are not only utilized to operate the vertical movements of the punch-carrier, but also to operate upon the space mechanism and the unit composition-register. The longitudinal levers, which we will now refer to, simply operate upon the character-representing mechanism, which in turn controls the horizontal movements of the punch-carrier. Directly under the stem A² of each key is a longitudinal lever B' of a series, except under the keys on the central vertical line. The levers B' are also journaled in suitable bearings w.

Before proceeding further with the details of construction we will state that while a number of the levers B have three arms, one operating upon the character-representing pins, another upon the space-representing pins, and the last one upon the registering mechanism, others of the levers have an additional arm for acting upon the vertical reverse-pins, as will be described in detail. The longitudinal levers B' are each provided with arms for projecting the pins on the right-hand pin-wheel, and some of these levers have an additional arm for projecting the horizontal reverse-pins.

In order to simplify the construction, we will refer to the skeleton view, Fig. 20, and follow out the movements of the several operations when the key having "v" upon it is depressed. This character is in the central vertical line, and in order to bring the character-punch in proper position before the matrix-sheet the punch-carrier will have to be lowered one point, so as to bring the "v" opposite the impressing mechanism. The key only operates upon the transverse lever B, as it will be remembered that a lever B' is omitted on the central vertical line.

The journal $B^2$ of the lever B has a character-pin-operating arm $B^3$ and a space-pin-operating arm $B^4$ and a unit-registering arm $B^5$. The arm $B^3$ is forked at its lower end and passes over a shouldered rod $B^6$, which on the depression will be moved in the direction of its arrow. The arm $B^3$ acts against one of the shoulders on the rod, as clearly shown in Fig. 6. As soon as the stroke is made a spring $B^7$ returns the lever and its parts to their normal positions ready to receive the next stroke. The rod $B^6$ is connected to one arm of a bell-crank lever $B^8$, Figs. 20 and $8^a$, the other arm of the lever being connected to a rod $B^9$, which in turn is connected to one arm of a pin-striker C', which is carried by a striker-frame C, as clearly shown in Fig. 3. This striker acts upon the outer row of pins of the left-hand pin-wheel, which, it will be remembered, has two rows of character-representing pins D D', the outer row being D and the inner row being D'. These pins D D' are mounted so as to slide in the holes in the left-hand pin-wheel E and are retained in position by friction mechanism. (Not shown, as any of the ordinary devices may be employed—such, for instance, as a band bearing upon the several pins or friction mechanism carried by the pin itself.) We would state here that these character-pins may be projected either of two distances. (Indicated by dotted lines in Fig. 20.) For instance, if the character-key marked "v," Fig. 20, is depressed its arm $B^3$ will move in space before striking the collar on the rod $B^6$, Fig. 6. Consequently the pin-striker will be moved only one-half of its full distance, and consequently the pin of the outer pin row will be projected to the intermediate dotted line, or the first distance. These transverse rows of keys, Fig. 1, with the exception of the central row, are arranged in pairs. For instance, the keys in the rows 1 1 on each side of the central row project the pins of the outside row the first distance and the key rows 2 2 project the outside row of said pins the full distance, and the keys in the rows 3 3 project the pins in the second row the first distance and the keys on the rows 4 4 project the pins on the second row the full distance. The keys on these third and fourth transverse rows have arms $B^{61}$, acting upon a rod $B^{61}$ (similar to the rod $A^6$,) which acts on the bell-crank lever $B^{19}$, connected by a link $B^{62}$ to the striker $C^2$, Figs. 1 and $8^a$.

It will be understood, as previously remarked, that the levers B and their connections only move the punch-carrier in vertical lines, as the horizontal movements of the punch-carrier are effected through the pins on the right-hand pin-wheel E'. The levers B above the central row of characters move their respective characters into position directly through the medium of the pins and the direct connections to the punch-carrier, while the levers below the central line of characters not only project their respective pins in the pin-wheel E, but also project pins in the vertical reverse-pin row on the right-hand pin-wheel E', which we will describe hereinafter.

We will now describe one of the simplest horizontal movements by referring to one of the keys on the central transverse row marked "e." This key and all keys on the central row have the same relation to the pins on the pin-wheel E' as the key marked "v" and as the keys on the vertical row have to the pin-wheel E. Directly under all of the keys of the keyboard, with the exception of the central longitudinal row, are levers B, alluded to above. These levers are arranged in pairs similar to the arrangement of the transverse levers B—that is, the levers 1 1, Fig. 20, are paired to project the pins on the pin row $D^2$ the first distance and the levers 2 2 are paired to project the pins on the first pin row $D^2$ the full distance, while the levers 3 3 are paired to project the pins on the second pin row $D^3$ the first distance and the levers 4 4 project the pins on the said pin row $D^3$ the full distance, so that if we press the letter "e" it will act to project the pins in the pin row $D^2$ the first distance the same as the letter marked "v" operates in reference to the pins in the pin row D of the pin-wheel E. The two outside levers acted upon by the keys on the longitudinal lines 3 and 4 on each side of the central line, as before remarked, are pivoted in bearings $w$ and have arms $B^{10}$, connected by a link $B^{11}$ to one arm of a bell-crank lever $B^{12}$, which is mounted loosely upon the rock-shaft $B^{13}$, adapted to bearings $w'$ $w'$ on the frame of the machine, as clearly shown in Fig. 2. The other arm of this lever is connected by a link $B^{14}$ to a striker $C^6$. The levers B' directly under the keys on the longitudinal lines 3 4 on each side of a central line are connected by a link $B^{15}$, Fig. 21, to an under arm $B^{16}$, secured to the rock-shaft $B^{18}$, which passes up through the sleeve $B^{12}$, alluded to above, and has an upper arm $B^{16}$, Fig. 1, connected by a link $B^{17}$ to the striker $C^5$, which projects the pin on the outside pin row $D^2$ on the pin-wheel E'.

In order to obtain the two movements of the pins from the levers B' just described, we provide each lever with two steps, as clearly shown in Figs. 1 and 20, one step being nearer the fulcrum of the lever than the other step and one step being under one of the rows of the keys and the other step being under another row of the keys. For instance, in Fig. 20 the two steps of the lever B' are clearly shown. (The step nearest the fulcrum being on the longitudinal key-line 4 and the step farther away from the center being on the key-line 3, if the key "u" were depressed it would project the pin the first distance, owing to the limited movement of the lever, but if the key "y" were depressed, it being nearer the fulcrum, it would depress the lever the full distance, and consequently would project the pin the full distance. The same result would be obtained in operating the other levers, which are arranged in substantially the same manner. The projected pins act upon what are hereinafter described as performing-rods, such as those marked L and $L^3$, Figs. 1 and 21, for controlling the unit-feed of the carriage and the character-locating mechanism. Each of these performing-rods has two steps on its outer end to engage with the pins, the first step being in the path of the pins which are projected only the first distance and the other steps being in the path of the pins which are projected the full distance. It will be understood that by depressing a lever B' it will act upon one or other of the pin rows $D^2$ $D^3$ to move the punch-carrier in a horizontal line. Thus the pins on the right-hand pin-wheel E' will move the punch-carrier in a direction at right angles to the line of movement caused by the projection of the pins D D' on the left-hand pin-wheel E, so that it will be readily seen that a single movement in one or the other direction will bring the characters on the vertical line above the center and the horizontal line on the right of the center, and by combining these movements we can bring any of the sixteen characters in the right-hand upper space into position to be impressed upon the matrix-sheet. We will describe these combination movements by referring to Fig. 20. If we depress the character "p," it will act upon the levers B and B', as indicated in said figure, as both of these levers are under the key. Consequently a pin on an outer pin row of a pin-wheel E will be projected the first distance and a pin on the second pin row $D^3$ the first distance on the pin-wheel E'. Consequently, as shown by the diagram Fig. 17, the punch-carrier will be lowered one distance through the medium of the pins on the pin-wheel E and moved horizontally to the left three distances through the medium of the projected pin on the pin-wheel E', thus combining the vertical and horizontal movements above alluded to in reference to the characters "v" and "u."

We will now describe the mechanism by which the vertical reverse movement is given to the punch-carrier—that is, the movements by which all of the characters below the horizontal central line are raised to that line—so that if these movements combine with the direct horizontal movements all of the characters in the lower right-hand square will be brought into the impressing position. $D^4$ are the pins in the third row of a pin-wheel E', and these pins are what we term "vertical reverse-pins"—that is, they operate upon mechanism to raise the punch-carrier so as to bring the character-punches that are below the central horizontal line in position on that line. These pins are operated through mechanism from the keys below the central horizontal line on the keyboard. On the journal of each lever B, under the said keys, is an arm F, which acts upon a shouldered rod F', connected to an arm $F^2$ and a rock-shaft $F^3$, extending across the machine and adapted to suitable bearings $w^3$. At the opposite end of this rock-shaft $F^3$ is an arm $F^4$, to which is attached the rod $F^5$, secured to one arm of the vertical reverse-striker $C^7$. This striker is in line with the pins $D^4$ in the third pin row. Consequently any movement of the keys below the central horizontal line will cause the striker to project one of the pins $D^4$. To illustrate this movement, we will, for instance, select a key on which is marked the "-" (shown clearly in Fig. 21) and depress it, causing the levers B B', which cross each other at this point, to move and project their respective pins, the lever B projecting a pin D' to the first distance on the second pin row of the pin-wheel E and the lever B' projecting a pin on the second pin row of the pin-wheel E'. The lever B, being also connected with the mechanism for giving the vertical reverse motion to the punch-carrier through this mechanism, projects a pin $D^4$ on the third row of pins. Consequently when these pins act in unison upon the mechanism for actuating the punch-carrier the carrier is raised in a diagonal line toward the center, or, in other words, opposite the impressing-plunger.

It will be understood that the action of the two character-representing pins is the same as if the character represented were in the right-hand upper corner; but in order to bring the characters below the central horizontal line into position there must necessarily be an additional movement, and this is accomplished by the vertical reverse-pin in the pin row $D^4$, described above. Thus when these three sections are taken in conjunction they bring the character-punch diagonally into position to be impressed into the matrix-sheet.

We will now describe the movements of the horizontal reverse mechanism, which is actuated by any of the keys on the left of the central vertical line. We will take as an example the upper-case "C." On the journals of each lever B', to the left of the center line, is secured an arm $F^6$, which acts upon the rod $F^7$, giving it movement in the direction of the arrow, Fig. 21. This rod $F^7$ is connected to one arm $F^8$ of a bell-crank lever, the other arm $F^9$ being connected to the link $F^{10}$, which in turn is attached to the horizontal reverse-striker $C^8$, which projects a pin $D^5$ in the fourth pin row in the wheel E', so that when the key "C" is depressed it acts on the levers B B', as shown clearly in Fig. 21; but as the horizontal reverse-striker is also connected to the lever B' the character-punch will be moved downward and toward the right to the center position opposite the impressing-plunger. It will be understood that on the depression of the lever B a pin on the second pin row of a wheel E is moved the first distance and that on the depression of the lever B' the character-representing pin $D^3$ is projected one distance. Thus when these pins act on the mechanism to adjust the punch-carrier it will be moved three points or distances in either direction, and these movements, combined with the horizontal reverse motion, will bring the character-punch to the position at the center, as above remarked.

We will now describe the movements caused by the depression of any of the keys in the left-hand lower corner, and to shorten this description we take a character-key that is on the vertical and the horizontal line which cuts through the "-" and the upper-case "C," the movements of which were explained above. As indicated in Fig. 21, the key would be the right-hand quotation. Consequently when this key is depressed it depresses a lever B under the lower half of the keyboard and the lever B' under the left-hand side of the keyboard, projecting their respective pins $D'$ and $D^3$ and also projecting a pin in the vertical reverse-pin row $D^4$ and projecting a pin in the horizontal pin row $D^5$, as both the levers B B' are connected to their respective reverse-strikers, as will readily be seen by referring to the view Fig. 21. This illustrates the most complex movement there is on the keyboard, and it is simply combining the previously-described movements, so that it does not necessitate other intricate mechanism. So it will be seen that the simplest movements are the single movements required when a key on either the vertical central line or on the horizontal central line is depressed, projecting only one of the character-representing pins, and on depressing any of the keys in the right-hand upper square of the keyboard a character-pin on either pin-wheel is projected. When a key in either the left-hand upper square or in the right-hand lower square is depressed, then a character-representing pin on either pin-wheel is projected, and in addition a single reverse movement upon either the horizontal or upon the vertical reverse-pins, according to the location of the characters, and, finally, when a character-key in the lower left-hand square is depressed the character-representing pins are projected in each wheel, and both a horizontal and a vertical reverse-movement pin is projected. Thus there are only four movements required to bring any of the eighty characters indicated at the keyboard to the position to be impressed into the matrix-sheet.

*Space-representing mechanism.*—We have described above how the character-representing pins are selected, and we will now describe how the space-representing pins are selected. Referring to the diagram Fig. 18, it will be noticed that there are three pin rows $D^6$, $D^7$, and $D^8$ on the pin-wheel E. These three rows represent from one to five units of feed of the matrix-carrier. Thus the pins of the pin row $D^8$ represent one-unit feed, the projection of the pins of the pin row $D^7$ of the first distance represent two units, and when the pins are projected the full distance they represent a three-unit feed. Projecting the pins on the pin row $D^6$ the first distance represents the four-unit feed and the full distance the five-unit feed. Before proceeding further with this description it will be understood that we have divided the character and spaces into units from one to five, so that, for example, "i" is a two-unit character, "a" is a three-unit character, "A" a four-unit character, and the "M" is a five-unit character. The single-unit pin in this instance we only use in contracting the word-space when justifying. The spaces between the words are always represented in the first instance by projecting a pin in the pin row $D^7$ the full distance, representing three units.

It will be noticed on referring to the diagram Fig. 18 that the majority of characters represented are of the three and the four unit widths, and the only characters occupying the two-unit spaces are the lower case letters "f," "l," "t," and "i," and the letters requiring the greatest number of units—that is, five—are the letters "m" and "w" and the letters "M" and "W," and in order to avoid confusion and difficult construction we employ one mechanism to set the representation-pins for the two and the five unit feeds and another but more direct mechanism to set the representation-pin for the three and four unit feeds.

We will now refer to the mechanism by which the three and four unit representing pins are projected. On the journals $B^2$ of a majority of the levers B are mounted arms G, Figs. 1 and 21, and in the present instance these arms G are mounted on six of the journals, their levers extending under the character-keys requiring only a three-unit feed. These arms operate upon a collared rod $G'$, which is connected by a bell-crank lever $G^2$, Figs. 7 and 8, to a rod $G^3$, which in turn is connected to the pin-striker $C^3$, which will project the pin $D^7$ on the fourth pin row the full distance, representing three units. Other of the journals $B^2$ act upon the bell-crank lever $G^6$, two of them through the arm $G^4$, acting upon the collared rod $G^5$, connected to the bell-crank lever $G^6$, and the other journal $B^2$ through the arm $B^{18}$, hereinafter referred to, Fig. 8ª. The bell-crank lever $G^6$ is connected to a rod $G^7$, which in turn is connected to the pin-striker $C^4$, which will project a pin on the third pin row $D^6$ of the pin-wheel E the first distance, indicating four units.

As mentioned above, the characters "M," "m," "W," "w," and "f," "l," "t," and "i" are mounted upon special mechanism by which their widths are represented. Thus, for instance, when a character-key "v" is depressed, as indicated in Fig. 20, it not only projects a character-locating pin on the first pin row of the pin-wheel E, but it also projects a three-unit-representing pin on the fourth row of the said wheel, as clearly shown in Fig. 20. The same is true of the different characters of the keyboard that at every stroke of the key a character is not only represented, but the space the character occupies is also represented by a pin.

For convenience we have mounted the several bell-crank levers $B^8$, $B^{19}$, $G^2$, and $G^6$ on the journal $B^2$ of the last lever B of the series, as clearly shown in Figs. 7 and 8ª, and in order to move certain of these bell-crank levers upon the said journal we mount all of the levers loosely thereon and provide a rigidly-attached arm $B^{18}$, having two fingers which will come in contact with and move the bell-crank levers $G^6$ and $B^{19}$. Thus by operating any one of the keys of the top row, Fig. 1, the journal $B^2$ of the lever B below those keys will, through the medium of this two-fingered arm $B^{18}$, attached to that journal, operate the two bell-crank levers $G^6$ and $B^{19}$, and thus the corresponding two strikers will project a pin each on the second and third rows, one a character-locating and one a space pin.

Before proceeding with the description of the special mechanism through which the special keys operate we will describe the word-space mechanism. As the center space of the keyboard is not occupied by a character-key, owing to the fact that the center space of the punch-carrier is left blank to allow the impression-plunger free play when the character is not located in line with it, we utilize this space on the keyboard for the word-space key $G^8$, and, as will be remembered, the keys on the horizontal central line only act to represent the characters on the longitudinal levers B'. Consequently the transverse lever that is represented as under these keys is simply for the purpose of projecting a three-unit-space-representing pin, and by placing the space-key at the point indicated we utilize said bar to represent the word-space, which is invariably at the time of representation a space of three units. As there is no longitudinal bar under the vertical central line of letters, we only register by the depression of the space-key a word-space.

We will now describe the special mechanism by which the special keys alluded to above project their spacing-pins, so as to represent either a two-unit or a five-unit space. Referring to the sectional plan, Fig. 7, and side view, Fig. 8, we will take up the two-unit-space characters first. These characters are in the present instance four in number—"f," "l," "t," and "i." Under the keys of the letters "f," "l," "t" are arms H' H' H', mounted upon the rock-shaft H, adapted to bearings $w^4$ on the frame of the machine. This rock-shaft H has two arms $H^2$ and $H^3$. The arm $H^2$ acts upon the rod $B^6$, which is connected to the pin-striker C', which projects the pin on the first pin row D' of the wheel E the first distance for the location of the punch-carrier, and the arm $H^3$ acts upon the collared rod G', which is connected to a striker $C^3$, which projects a pin in the pin row $D^7$ the first distance, representing a two-unit space. It will be noticed on referring to the plan view, Fig. 1, that the transverse bar B, which is under the keys of the line in which "t," "f," and "l" are, is curved, so as to escape being operated by the said keys, as the remaining keys of the line when depressed would represent a three-unit space, whereas the characters "t," "f," "l" are only two-unit-space characters. Directly under the character "i" is an arm $H^4$, which is secured to a rock-shaft $H^5$, having at its opposite end the arm $H^6$, acting upon the collared rod G', through which the striker $C^3$ projects its pin for a two-unit space. It will be understood that there is sufficient lost motion between the collars on the rod G' and the arms $H^3$ and $H^6$ to prevent the arms moving the collared rod more than would be necessary to project the representing two-unit pins beyond the first distance.

We will now refer to the keys "M," "m," "W," "w." These keys being directly above bars which would project the pin on the pin row $D^6$ of the pin-wheel E the first distance, which is equivalent to four units, it requires to push the pin the full distance—that is, one unit more—and to accomplish this we mount under each of these characters above alluded to rock-shafts $H^7 H^7 H^7$, having arms $H^8$, which are in line with the keys. These shafts have arms $H^9$, which act upon the collared rod $G^5$, connected to the pin-striker $C^4$, and as these arms are close up to the shoulders of said collars they will project the pin the full distance, indicating five units. It will readily be seen that this movement does not interfere with the four-unit movement of the lever above referred to. Thus, as before remarked, while the majority of the letters occupy three and four unit spaces four of these special letters require two-unit spaces and the balance of the special letters require five-unit spaces and the word-space key is of the three-unit space; but, as described hereinafter, in order to justify the line this three-unit word-space can be increased by projecting a pin on the third pin row to indicate either a four or a five unit space, or the space can be contracted by returning the projected three-unit pin to the first distance, representing a two-unit space, or by entirely returning said three-unit pin and projecting the pin representing one-unit space.

*Unit-register.*—We will now describe the unit composition-register and the mechanism by which it is operated from the keyboard simultaneously with the representation of the characters and spaces upon the pin-wheels, reference being had to Figs. 1, 2, 3, 6, 19, 20, 21, and 22. Mounted in suitable bearings $w^5$ is a longitudinal rock-shaft I, through which motion is imparted from the keyboard to the unit composition-register. This rock-shaft has a series of arms $i$ $i'$ $i^2$ $i^3$. As will be seen by referring to the diagram Fig. 22, the arms $i$ are all of the same length and are the three-unit-registry arms and the arms $i'$ are the four-unit-registry arms. The arms $i^2$ are the two-unit-registry arms and the arms $i^3$ are the five-unit-registry arms. On a majority of the journals B² of the transverse key-levers B are arms $i^4$, so as to act upon the three-unit levers $i$ of the rock-shaft I, Figs. 1 and 21. These arms are on the same shafts as the arms G for projecting the three-unit-space pins. On the balance of the journals there are secured arms $i^5$, which act upon the four-unit arms $i'$ of the rock-shaft I. These arms are in like manner upon the same journals as the arms G⁴, which project a four-unit-space pin. The arms $i$ and $i'$ of the rock-shaft I are preferably on one side of the shaft and the arms $i^2$ $i^3$ on the opposite side of the shaft. The arms $i^3$ are connected to arms H¹⁰, Figs. 6, 7, and 8, on the shafts H⁷ by rods H¹¹, which pass up through the arms $i^3$ and are suitably capped, so that on the movement of the keys which act upon the shaft H⁷ the rock-shaft I is rocked. The shafts H and H⁵ have arms H¹², which are connected by rods H¹³ to the arms $i^2$ in the same manner as the arms on the shaft H⁷. Consequently it will be seen that the shaft I is rocked from its normal position to four different positions, according to the number of space-units in the character depressed. We preferably extend one of the arms $i'$ to form a striker $i^6$, Figs. 3 and 22, which will raise the pawl-carrier I', mounted loosely upon the stationary axle I². On this carrier is a spring-pawl I³, which engages with the dial ratchet-wheel I⁴, having the proper number of teeth cut therein, as clearly shown in Fig. 6. A spring $i^7$ returns the pawl-carrier to its normal position, and the spring is sufficiently strong to also return the rock-shaft I to its normal position ready to receive the following movement: On the ratchet-wheel I⁴ is a dial I⁵, graduated to correspond to the number of teeth in the ratchet-wheel. The number of teeth in the wheel corresponds to the number of units in the predetermined line, together with a sufficient number of units to register the amount of matter that would in some instances, owing to the indivisibility of words, extend beyond the predetermined line of one hundred and forty-four units. In the present instance we have sixteen units additional, as will be clearly understood by referring to Fig. 19. The dial is marked from the "128" unit-mark to the "144" unit-mark to indicate the number of units that a short line would fall short of the predetermined length of the line. This is also shown in Fig. 19. On an extension of the support W' for the axle I² is a pointer I⁶, back of which travels the dial I⁵, so that as the keys are depressed this dial is moved two, three, four, or five movements, depending upon the key depressed. When the portion I⁷ of the dial reaches the pointer, the operator can determine whether to complete the word being composed or whether to make a syllabic division, and it matters not whether the word is short of the one hundred and forty-four units or a trifle longer than the one hundred and forty-four units, as the mechanism described hereinafter will readily adjust the word-space-unit pins after the line is composed. On the dial is a projection I⁸, which acts upon a trip-pawl I⁹ on a clapper-lever I¹⁰, pivoted to supports W' and having at its end a clapper I¹¹, which strikes a signal-bell I¹². The pin I⁸ is so arranged in respect to the pointer I⁵ that it will give the signal when in the neighborhood of the one hundred and twenty-eighth unit-mark, so as to give the operator warning in time to determine how to close the line.

The mechanism for automatically justifying the line will be described hereinafter.

*Pin-wheels.*—We will now refer to mechanism by which motion is imparted to the pin-wheels, referring to Figs. 1, 2, 3, 20, and 21. Mounted in bearings W² W² is a hollow shaft E², on which are mounted the pin-wheels E E', as clearly shown in Fig. 3. Passing through the hollow shaft is a shaft $c$, carrying heads $c'$ $c'$. These heads and the shaft compose the striker-frame C. On these heads are mounted on pivot-pins $c^2$ the series of strikers and arms alluded to in the preceding description. We preferably construct the pin-wheels as shown in Fig. 3, so as to make them as light as possible and make a double bearing for each pin, the pins being arranged in series in concentric circles and radial rows, as shown in Fig. 2 and as fully described above. On the periphery of the pin-wheel E' is a feed-ratchet E³, through which motion is imparted to both pin-wheels, and at one side of this feed-ratchet is a pair of escapement-ratchet-wheels E⁴ E⁵. (Illustrated more particularly in Figs. 2 and 2ᵇ.) Mounted in suitable standards W³ is a power-driven shaft W⁴, which is, in fact, the motion-shaft of the machine. On this shaft we preferably mount a driving-wheel, which may be connected with power mechanism or with pedal mechanism, as desired. On this shaft W⁴ is an eccentric E⁶, and adapted to the eccentric is a strap E⁷, having a pawl E⁸, which engages with the teeth of a pin-ratchet E³. This pawl is held into gear with the ratchet-teeth by a suitable spring, so that under ordinary circumstances the pin-wheels are given intermittent forward feed.

It will be noticed that the striker-carrying frame C is loosely mounted practically within the hollow shaft carrying the pin-wheels and is connected to the pin-wheels through the medium of an escapement-lever, so that when the key is depressed to operate one or more strikers the escapement practically attaches the striker-frame to the pin-wheels till the proper pins are projected by their respective strikers, after which the striker-frame is released sufficiently to locate itself opposite another radial row of pins on the pin-wheels, owing to the movement of the escapement from one line of teeth to the other. While each pin-wheel has a forward motion in the direction of its arrow, Fig. 2, a spring or weight is employed to tend to move the striker-frame in a reverse direction. We have shown in the drawings a spring $c^3$, coupled to a projection $c^4$ at the rear of one of the heads of the striker-frame, so that as the keys are depressed the tendency of the striker-frame as the ratchet releases it is to move step by step in a direction the reverse of that of the pin-wheels. When the striker-frame is carried by the pin-wheels a certain distance, owing to the operator not depressing any of the keys, the striker-frame will operate a vertical bar $E^{10}$, which is held up by a spring $E^{10}$, and this bar has a pin $E^{11}$, which acts upon the eccentric-pawl $E^8$, throwing it out of engagement with the ratchet-teeth $E^3$, thus stopping the forward feed of the pin-wheel. The bar $E^9$, as shown in Fig. 2, is mounted in an arm, which will be described in referring hereinafter to other details of the invention. The object of this independent motion of the striker-frame is first to enable an operator to compose and set the pins upon the pin-wheels at times at a speed faster than the pin-wheels are operated through the medium of a power-driven eccentric-pawl. If, for instance, the operator depresses the keys in quick succession, the striker-frame will be moved in a reverse direction to that of the movement of the pin-wheels, so as to insure the proper projection of the pins in their proper order; but if the operator be slower in composing than the feed of the pin-wheels the striker-frame will reach a point when it will be carried with the pin-wheels until it reaches the vertical bar $E^9$, and the continued motion of this frame will depress this bar and throw the eccentric-pawl out of gear with the pin-wheel ratchet, thereby stopping the feed of the pin-wheel until the operator composes subsequent matter. The connecting-joints between the striker-arms $C'$ $C^2$, &c., $C^5$ $C^6$, &c., and their operating-rods are of such a character as to allow the needed angular motion between them.

*Escapement.*—J is the escapement-lever, acting in conjunction with the escapement-teeth $E^4$ $E^5$, having a motion from one to another imparted to the keys by the keyboard. The lever J has an arm, to which is connected a rod $J'$, attached to an arm $J^2$ on a rock-shaft $J^3$, mounted in suitable bearings $w^6$. This rock-shaft has secured to it a transverse lever or universal bar $J^4$, which passes under all of the longitudinal key-levers B' and under the central rocking lever $J^5$, which is acted upon by the central vertical row of keys of the keyboard for the sole purpose of depressing the lever $J^4$, so that no matter what key is depressed by the operator it will move the escapement J, allowing the pin-wheels to move one intermittent movement, so as to bring a new radial line of pins in front of the strikers. The end of the pivoted escapement-lever J is, as shown in Figs. 1 and 21, provided with a tooth normally in engagement with a tooth of the row $E^5$, Fig. 26; but whenever the universal bar $J^4$ is operated on the depression of a key the toothed outer end of the lever J is thrown over out of engagement with the tooth $E^5$ and into engagement with a tooth of the row $E^4$. The teeth of the two rows are stepped, so that then the lever J will have moved from the position shown by full lines in Fig. $2^b$ to the position shown by dotted lines in that figure. Then when the end of the lever J moves outward again from contact with the tooth $E^4$ it will catch on the next of the teeth $E^5$, and so on. It will thus be seen that when the keys are not operating the escapement locks the striker-frame to the pin-wheels, so that it will move with the pin-wheels until released again by the depression of a key, which releases the striker-frame and allows it to fall back one radial line, and, as described above, if the operator does not depress the keys the striker-frame will eventually throw off the feed-pawl by striking the upright pawl $E^9$, which throws out the feed-pawl and stops the pin-wheels from revolving.

*Carriage-key.*—The inner row of pins $D^9$ on the right-hand pin-wheel $E'$ is a representative carriage-pin row—that is, these pins represent the return movement to be given to the carriage and at the same time the line-feed, so that when one of these pins is projected at the end of the composed line it will return the matrix-carrier by mechanism described hereinafter to the position of a new line. The carriage-pins are acted upon through a series of mechanisms connected to a special carriage-key K, which acts upon a lever $K'$ on a rock-shaft $K^2$, having an arm $K^3$, which is attached through the medium of a rod $K^4$ to the striker $C^9$, which acts upon the pins of the pin row $D^9$. The shaft $K^2$ of the carriage-key has also an arm $J^6$, which is connected to the escapement-arm $J^2$ by a rod $J^7$, so that on the depression of this carriage-key the striker-frame will be moved onto another radial line of pins on the pin-wheel, Figs. 1 and 2.

The carriage-release key $S^{16}$ (shown above the keyboard in Fig. 1) we will not describe at this point, as it is not represented upon the pin-wheel, but acts directly upon the carriage mechanism and will be described in connection with this part of the machine later on.

We have described up to this point mechanism by which a line of matter can be represented prior to being justified and impressed upon the matrix-sheet, and we will now describe the mechanism which is acted upon by the representing-pins on the pin-wheels, so as to impress in their proper order the representative characters upon the matrix-sheet.

The description of the automatic justifying mechanism would be next in order; but to simplify the specification we have placed it at the end of the description of the general machine, thus enabling the reader to follow the description and operation of the several parts without reference to the justifying mechanism, and the construction and operation of the justifying mechanism will be more readily comprehended when described after the other parts have been set forth.

*Character - locating mechanism.* — This mechanism comprises levers, locating-cams, and connections whereby the pins upon the pin-wheels in the present instance act to vertically locate the punches represented on the two first rows of the left-hand pin-wheel E corresponding with the movement of the transverse levers B, which are acted upon directly by the keys of the keyboard to project the pins above described.

Referring in the first instance to Fig. 2ª, L is a performing-rod connected to one arm of a bell-crank lever M, vertically mounted in bearings $w^7$ upon the standard $W^5$. This bell-crank lever M is attached to a switch-actuating rod M', Fig. 1, having two points $m'$ $m^2$. The point $m'$ will actuate its switch when the operating-rod L is actuated by a pin that is projected only the first distance. When the rod is actuated by a pin moving to the second or full distance, the point $m^2$ actuates its switch. The actuating-rod $L^b$ is connected to a second bell-crank lever $M^2$, which is attached to the switch-operating rod $M^3$, having points $m^3$ $m^4$ similar to the points of the rod M'.

On the shaft $W^4$ is secured a locating-cam P for vertically locating the punches of the punch-carrier. The cam P has eccentric cam-grooves $p'$, $p^2$, $p^3$, and $p^4$ cut into its face and one concentric groove $p$, as clearly shown in Fig. 11, and adapted to one or other of these grooves is a toe $p^5$ and a rod P', which is carried by a yoke $P^2$, having racks $P^3$ $P^4$, which mesh, respectively, with the cog-arcs Q Q', Figs. 4, 9, and 10. These cog-arcs are mounted loosely on a shaft $Q^2$, to which is secured a clutch-arm $Q^3$. This arm will transmit a rocking motion to the shaft $Q^2$ through either of the two cog-arcs, depending upon which one is thrown in gear therewith, so as to either lower or to raise the punch-carrier. In a rearward extension of the cog-arc Q is a clutch-pin $q^5$, which is retained in an orifice in the arm $Q^3$ by means of a spring-arm $q^6$, Figs. 9 and 10. Carried by the cog-arc Q' is a pin $q^{50}$, which when the arcs are in their normal positions is in line with the orifice in the arm $Q^3$ and also in line with the pin $q^5$ of the cog-arc Q, so that when the pin $q^{50}$ is forced by the lever $Q^4$ into the orifice in the arm $Q^3$ it will force the pin $q^5$ out of the orifice, so that the arm and its shaft $Q^2$ will move with the cog-arc Q', and consequently raise the punch-carrier to the position indicated by the representing-pin. The pin $q^{50}$ of the cog-arc Q' is actuated by a lever $Q^4$, deriving its movement through mechanism from the vertical reverse pins in the pin row $D^4$ of the right-hand pin-wheel E'.

We will now turn back to the locating-cams, referring particularly to Figs 11, 11ª, and 11ᵇ. As before remarked, this cam has four eccentric grooves $p'$ $p^2$ $p^3$ $p^4$, and in order to direct the toe $p^5$ of the rod P' into one or the other of the grooves we provide four switch-points $q'$ $q^2$ $q^3$ $q^4$, pivoted as shown in Fig. 11, and attached to the pivots of these points are switch-levers $n'$ $n^2$ $n^3$ $n^4$, so that when the points of either of the actuating-rods M' $M^3$ are projected into the path of one of these levers they are moved and throw over their respective points so as to guide the toe $p^5$ into their respective grooves, as will be clearly understood by referring to Fig. 11. Consequently if the toe is thrown into the first eccentric groove $p'$ of the cam it will lift the rod P' and its yoked frame one distance, moving the cog-arc one distance, which imparts motion to the shaft $Q^2$. On the latter is a pinion $Q^5$, which meshes with a vertical rack $Q^6$, forming part of the rod $Q^7$, attached to the bar R, upon which is mounted the punch-carrier. The rod $Q^7$ is guided in a frame $W^6$, mounted on standards $W^7$ $W^7$, Fig. 4. We would state here that in the present instance the bar R has two horizontal rods R R', on which slides a frame $R^2$, in which is mounted the punch-carrier proper. Horizontal motion is imparted to this frame R by mechanism alluded to hereinafter, the frame traveling upon the rods R' R', so that it will be seen that while mechanism which we have described in detail only transmits vertical motion to the punch-carrier other mechanism will give an independent horizontal motion to the punch-carrier, thus locating any of the punches of the punch-carrier.

Before describing the other levers which are actuated by the pins on the right-hand pin-wheel we will first describe how the character-pins on the first two pin rows adjust the punch-carrier so that the proper punch is selected, using for illustration the simple character "v," Fig. 20. As remarked above, the depression of this character-key depresses a lever B, which projects a pin on the first pin row D one distance. We will omit for the present the space representing mechanism. It will be remembered that there is a sufficient number of pins in the pin row to represent in the present instance a line of matter, and as the pin-wheels carrying the pins intermittently revolve the pin projected in time reaches a point where it will act upon the performing-rod L, pushing it forward in the direction of its arrow, Fig. 20, and forcing the switch-actuating rod M', through the medium of the bell-crank lever, toward the cam P one distance, so that its point $m'$ will be projected in the path of the first switch-lever $n'$, forcing the switch-point $q'$ down, closing the concentric groove $p$, so that the toe $p^5$ of the rod P' must travel during one revolution of the cam in the groove $p'$, thus raising the rod P', which in turn moves the cog-arc one distance, and it in turn transmitting a downward motion to the punch-carrier one distance, and, as will be seen by the diagram Fig. 17, this downward movement of the punch-carrier will bring the character-punch "v" to the central or impressing position in line with the impressing-plunger.

It will be understood that if a character-pin of the first row D is projected the full distance the point $m^2$ of the switch-actuating rod M' will move the switch-point $q^2$, and if the pins on the second pin row $D^2$ are projected the first or the second distances they will actuate mechanism to move the switch-points $q^3$ $q^4$, so that the punch-carrier will be drawn downward a corresponding number of distances. Thus we can locate by the simplest of mechanism any character above the central horizontal line on the central vertical line.

We will now describe mechanism for imparting a horizontal movement to the punch-carrier, so as to bring all the four punches on the central horizontal line to the impression position. This is accomplished by the projection of the pins of the first two pin rows $D^2$ $D^3$ on the right-hand pin-wheel E'. In order to simplify the description, we would state that similar mechanism is employed corresponding with the mechanism above described to give vertical motion to the punch-carrier. Rods $L^2$ $L^3$, similar to the rods L L', actuate rock-shafts, which in turn move switch-actuating rods having points similar to the switch-actuating rods M' $M^3$ to set the switch-points in a cam $P^5$ on the shaft $W^4$, Fig. 4. This cam actuates a rod $P^6$, carrying a rack-frame $P^7$, which actuates the cog-arcs $Q^8$ $Q^9$, loosely mounted on the shaft $Q^{10}$ and clutched thereto in a similar manner to the cog-arcs Q Q' on the shaft $Q^{10}$. On the shaft $Q^{10}$ is a pinion $Q^{11}$, meshing with a rack $Q^{12}$ on a rod $Q^{13}$, which is attached to a bar $R^3$, in which can vertically slide the frame $R^2$, carrying the character-punches. This frame, however, is under the control of this bar as regards any horizontal movement, it being under the control of the bar R as regards any vertical movement. A lever $Q^{14}$, Fig. 1, acts to clutch the cog-arc $Q^9$ to the shaft $Q^{10}$ in a manner similar to that shown in Fig. 10. This mechanism will therefore require no further description.

Referring to Fig. 20, if the character-key "e" is depressed it will project a pin on the first row of the right-hand pin-wheel one distance, which in turn will throw the first switch-point of the cam $P^5$ so that the cam will raise the rod $P^6$ one distance, which in turn will move the cog-arc one distance, the cog-arc imparting a horizontal movement to the punch-carrier to the left one distance, bringing into the impressing position the character-punch "e." It will be readily understood that this horizontal movement, if combined with a previously-described vertical movement, as for the character "v," will locate before the impressing-plunger the character-punch "d" in the right-hand upper square. Consequently the depression of any of the keys of this right-hand upper square of the keyboard will locate any of the character-punches in the right-hand upper square of the punch-character, as illustrated in Fig. 17.

We will now describe the mechanism by which the represented vertical reverse movement is transmitted to the punch-carrier. As previously remarked in describing the pin-wheels, the third pin row $D^4$ of the right-hand pin-wheel E' is the vertical reverse pin row, so that any of the characters below the horizontal central line that are depressed by the operator will actuate a pin in this pin row. The pins in this row in turn actuate a lever $L^4$, which is connected to a bell-crank lever $L^{10}$, connected by a rod $L^{11}$ to the lever $Q^4$, which acts upon the clutch-pin $q^5$ to lock the cog-arc Q' to the shaft $Q^2$. By clutching this cog-arc to the shaft $Q^2$ the vertical movement of the punch-carrier is reversed, and in place of the punch-carrier moving downward it will be raised, bringing to the central horizontal line the characters that are selected below the line. For instance, if the character "w" were depressed the same movement would be performed as if the character "v" were depressed, with the exception instead of the punch-carrier being lowered to position it will be raised to position, bringing the character-punch "w" in line with the impressing-plunger. If this vertical reverse movement is combined with the horizontal movement above described, any of the punches in the right-hand lower square of the punch-carrier can be located before the impressing-plunger.

We will now describe the mechanism by which the horizontal reverse movement is given to the punch-carrier, referring to Figs. 1, 2, and 21. The performing-rod $L^5$ is actuated by the projecting pins on the pin row $D^5$ of the right-hand pin-wheel E' and is connected with a bell-crank lever $Q^{14}$, which moves the clutch-pin of the cog-arc $Q^9$, so as to lock the said cog-arc to the shaft $Q^{10}$, thus giving a horizontal reverse movement to the punch-carrier. Therefore on the depression of any of the keys to the left of the central vertical line the punch-carrier will be moved from the left toward the right, bringing the character-punches to the vertical central line. Thus if the character "C" is depressed the character-pins will be selected as described in the earlier part of the specification, and the horizontal reverse-pin will be selected, so that when the character-pins act to select the character-punch the horizontal reverse-pin will reverse the horizontal movement of the carrier, locating the "C" punch before the impressing-plunger. Thus any of the punches of the left-hand upper square of the carrier will be brought into the impressing position.

Now it will be readily understood that if a pin in the vertical pin row $D^4$ and a pin on a horizontal pin row $D^5$ were set simultaneously then both movements would take place, and consequently if any of the characters of the lower left-hand square of the keyboard were selected both reversing-pins would be projected and a character-punch in the left-hand lower square of the punch-carrier would be located before the impressing-plunger.

It will be readily seen that by depressing any of the keys of the keyboard certain pins are projected, and these pins actuate certain mechanism which locate any of the character-punches of the punch-carrier in line with the impressing-plunger, thus insuring, although at a subsequent time, the proper location of a proper represented character.

*Carriage-feed.*—We have described fully the location of the character-punches before the locating-plunger and will now describe the mechanism which controls the movements of the matrix-carrier. Referring to Figs. 1, 2, 5, and 6, the pin rows $D^6$, $D^7$, and $D^8$ of the left-hand pin-wheel E are the unit-space-representing pins, representing the space occupied by each character and by each word-space. As will be noticed by the diagram Fig. 18, the one-unit space is not used at the time of composition and is simply used at the time of justifying. The three-unit space is used for all word-spaces during composition; but this word-space is increased or diminished by the justifying mechanism, as will be readily understood hereinafter, the indicated spaces 2 to 5 being used to indicate the different unit widths of the characters represented. It will be understood that before any movement of the matrix-carrier takes place an entire line of matter has been represented upon the pin-wheels and justified, so that when the pins reach the operating position to transmit their composed matter to the matrix-sheet they are justified so as to bring the matter to a standard length of line when impressed upon the matrix-sheet; but it will be understood that this matter is not impressed upon the matrix-sheet prior to the composition of a succeeding line of matter upon the pin-wheels; but as the new line of matter is being composed the previously-composed line is being located and impressed upon the matrix-sheet character by character in the order of the composition upon the pin-wheels. The space-unit pins set for the first line feed the matrix-carriage the proper number of units to correspond with the characters and with the word-spaces of the first line, and in this machine it will be observed that the unit-feed is in advance of the impression of the character.

Referring again to Fig. $2^a$, the performing-rod $L^6$ is in line with the four and five unit representing pins $D^6$ and the rod $L^7$ in line with the three and two unit representing pins in the pin row $D^7$, and the rod $L^8$ is in line with the one-unit-representing pins in the pin-row $D^8$. Each of these rods has a collar which comes in contact with an arm S on a rock-shaft S', having at its opposite end an arm $S^2$, to which is attached the unit-feed pawl $S^3$, engaging with the teeth of the wheel $S^4$. The shaft S' is mounted in suitable bearings $w^8$ and has a spring $S^5$ for returning the pawl $S^3$ and the lever S to their first positions. The pawl $S^3$ is a spring-pawl and can be held out of engagement with the wheel at the end of each line to allow the wheel to return to its first position. The ends of the rods $L^6$ $L^7$ acted upon by the pins are cut away a sufficient distance, as shown in the case of the rods L and L', Fig. 20, so that when the pins are projected the first distance they will act upon the stepped or cut-away portion, moving it the distance required. The collars on the rod act on the arm S and move it the number of unit-spaces according to which rod is acted upon by a pin, as will be readily understood by referring to Fig. $2^a$. Thus if a pin is projected one-half distance in the pin row $D^6$ the rod $L^6$ will be moved four units, the lever S will be moved four units, and also the pawl $S^3$ will be moved four units, giving to the feed-wheel $S^4$ a four-unit movement, and as this feed-wheel is connected directly to the matrix-sheet carriage said sheet will be moved four units. Other unit movements of the matrix-sheet will be understood without further description.

It will be understood that on each performing-rod for moving the switch-actuating rods there are two steps. The first step is in the path of the pins that are projected only the first distance, so that the long points of the actuating-rods only come in contact with their switch-levers. The second step is in the path of the pins when projected the full distance, so as to bring the short points of the projecting rods in line with their switch-levers. We are enabled to simplify the construction of the pin-wheels by making the pins of one pin row have two movements, as will be clearly understood by referring to Fig. 1.

We have now described all of the rods which are acted on by the pins of the pin-wheels. These pins as soon as they act on the rod complete their mission and are returned to their normal position by inclined plates $E^{12}$ $E^{12}$, one for each pin-wheel, as shown clearly in Fig. 1.

In order to return the performing-rods L to $L^9$ to their normal positions, they will have to be withdrawn from the path of the pin, and as soon as they are withdrawn they will spring back to their normal positions. The performing-rods are withdrawn by bell-crank levers $L^{11}$ $L^{11}$, which levers have arms carrying a pin $L^{12}$, adapted to a slot in the head of each rod. These two levers are actuated by a single cam and the levers are tied together by a connecting-rod $L^{13}$, so that movement imparted to one of the levers will be transmitted to the other through this rod. The lever $L^{11}$ on the right-hand side of the machine has an arm $L^{14}$, which is adapted to a cam-groove in a cam $L^{15}$, Fig. 1, and this groove in the cam is so cut that the long dwell allows the performing-rods to remain in the path of the pins of the pin-wheel during the intermittent movement of the pin-wheels, so that the pins can transmit movement to the rods, and the cam is so cut that immediately after this movement the performing-rods are withdrawn and at once return to their normal positions, ready to be acted upon by the next radial row of pins.

*Impressing mechanism.*—We will now describe the impressing mechanism by which the character-punches are projected into the matrix-sheet. T is a plunger adapted to suitable bearings in the frame of the machine and has a motion toward and from the punch-carrier and is mounted centrally in respect to the punch-carrier, its position being similar to that of the space-key of the keyboard. This plunger is connected to one arm T' of a bell-crank lever T², the arm T³ of which rests upon the cam W⁸ of the shaft W⁴. A spring T⁴ returns the plunger after the cam stroke. So it will be seen that when the shaft revolves the plunger is given an intermittent movement, and when a character-punch is placed in the path of said plunger it will be forced into the matrix-sheet the proper depth. It will be noticed that the bars R R³ are slotted to allow the plunger T to pass through the bars to the back of the located character-punch, Figs. 4 and 12.

*Punch-carrier.*—We will now describe the detailed construction of the punch-carrier proper. The frame R² is composed of an upper and of a lower head, as shown in Figs. 23 and 24, connected together by a rod R⁴ R⁴. The heads are grooved, as shown, for the reception of the punch-carrier proper, R⁵, (shown clearly in Fig. 13,) the punch-carrier having ribs on each end adapted to grooves in the upper and lower heads of the frame R². When placed in position in the arm, it is secured by clamps, or other fastening devices may be employed. The bar R³, which forms a continuation of the rod Q¹³, is so shaped as to pass around the punch-carrier frame proper and has orifices through which pass vertical rods R⁴ R⁴ of the frame R², so that any horizontal motion imparted to the rod Q¹³ will be transmitted, through this bar and the frame, to the punch-carrier. The frame R², being mounted on the arm R' of the bar R, which forms a continuation of the rod Q⁷, will move vertically with the rod Q⁷ and move the punch-carrier vertically. The rods Q⁷ and Q¹³ are continued beyond their respective bars and pass through suitable bearings in the frame W⁶, so that they are held rigidly as regards any motion from the punch or the matrix-sheet.

The details of the punch-carrier proper are shown in Figs. 12 to 17, inclusive. Each punch is shown in Fig. 16 as formed upon a shank R⁶, the character being upon the end and of a sufficient depth for the proper penetration of the matrix-sheet. The round shank is cut away at R⁷, so as to leave a half-round shank below this point. A portion, however, of the shank is left to form a lug R⁸, which acts upon the return-bar R⁹, the opposite side of this lug resting against the fixed plate R¹⁰, which is secured to the back of the frame R⁵ and in some instances may form a part thereof. The tail of the shank extends beyond the frame a sufficient distance to allow the impressing-plunger to force it forward, so that its head, carrying the character, will penetrate the matrix-sheet. The carrier-frame is made hollow, leaving two sides, in which is a number of holes corresponding to the number of character-punches used. These holes are round, and the shanks of the character-punches find bearing therein. The flat plate R¹⁰ closes one-half of each opening in the back frame, as clearly shown in Fig. 12. Thus while allowing the tail of the shank to pass through it prevents the shank from turning, thus keeping the character-punches on their feet. In the present instance we have eighty character-punches, and said punches are arranged as clearly shown in diagram Fig. 17, and correspond with the characters as arranged upon the keyboard. There are nine vertical rows of punches, and each punch is returned to its normal position by a spring-bar R⁹. In the present instance we have five of these bars, arranged as clearly shown in Fig. 15. Each bar is secured to a lever, and two sets of the levers are coupled together by springs, and the remaining lever has a spring which is secured to a permanent portion of the frame. Thus when the plunger forces a punch into the matrix it immediately returns said punch to its normal position by means of said spring-bars. In the present instance the extreme left-hand bar R⁹ in Fig. 15 is carried by a pair of pivoted levers *r*, connected by a spring *r'* to pivoted levers *r²*, which carry the third bar R⁹, counting from the left. The second bar R⁹ is carried by lever *r³*, connected by a spring *r⁴* to pivoted levers *r⁵*, which carry the fourth bar R⁹. The fifth bar R⁹ (shown in Fig. 15) is carried by a pair of levers *r⁶*, connected by a spring *r⁷* to a fixed point on the punch-carrying frame. Through the medium of these springs the several bars R⁹, acting on the lugs R⁸, Fig. 16, push back the punches of their respective rows after impressions.

The dotted lines in Fig. 12 indicate the various positions to which the punch-carrier can be moved.

*Matrix-carriage.*—On the standards W⁷ are two rails W⁹, on which the carrier used for the matrix-frame is mounted, Figs. 2 and 5. On this carrier is certain mechanism for raising the matrix, which will be described hereinafter. The matrix-sheet U' is so mounted in guides in the carrier U that while it will travel transversely with the frame U it will have an independent vertical movement. The matrix-frame is quadrangular in shape and has on each side two hinged clamp-bars U$^2$, which clamp the matrix-sheet to the frame, being held in the closed position by set-screws U$^3$ U$^3$ on arms U$^4$ of the clamps, as clearly shown in Fig. 5, the matrix-sheet being of a width to accommodate each line of matter to be impressed. The carrier U is connected to a drum S$^6$ on the feed-wheel S$^4$ by a cord or band S$^7$, which passes over the guide-roller S$^8$ and is attached to the frame, as clearly shown in Fig. 1. This mechanism feeds the frame forward between each impression. The weight S$^9$, attached to the cord S$^{10}$, which is secured to the opposite end of the carrier U, returns the frame at the end of each line. Other means may be employed for returning the carriage without departing from our invention.

We will now describe the mechanism for raising the carriage at the end of each line. On the back of the matrix-frame U are racks $u$ $u$, Fig. 2, with which mesh the pinions $u'$ $u'$ on a shaft $u^2$, one end of which has a ratchet feed-wheel $u^3$, which is fed forward by a spring-pawl $u^4$ on an arm $u^6$. A check-pawl $u^7$ is pivoted to the frame and has an arm $u^8$, which has an extension $u^{91}$, resting under the feed-pawl $u^3$. This arm $u^8$ can be raised by hand when the matrix-sheet is completed, so as to throw both the check-pawl and the feed-pawl out of engagement with the ratchet feed-pawl, so that when the finished matrix-sheet is replaced the matrix-frame can be lowered to position, as it will be remembered that the matrix-sheet in the present instance feeds upward.

Adapted to bearings mounted on the frame W$^6$ is a rock-shaft $u^9$, having arms $u^{10}$ $u^{10}$, carrying a cross-bar $u^{11}$, which acts upon the pawl-arm $u^6$. Thus the bar $u^{11}$ will always be under the arm $u^6$, no matter in what position the lateral frame may be. Secured to the rock-shaft $u^9$ is an arm $u^{12}$, attached to the performing-rod L$^9$, which is actuated by the inner pin row D$^9$ of the right-hand pin-wheel E'. Thus if a pin on this pin row is projected at the end of a composed line when it, the pin, reaches the performing position and strikes the rod L$^9$ it will, through the medium of the mechanism just described, raise the matrix-frame one line while the carriage is being returned to its normal position at the beginning of a new line by mechanism which we will now describe. The performing-rod L$^9$, Fig. 25, is connected to an arm S$^9$ on an upright shaft S$^{91}$, Figs. 2 and 4$^a$, which has an arm S$^{92}$ connected by a link or push-rod S$^{10}$ to an arm S$^{93}$ on an upright shaft S$^{94}$. On the upper end of this shaft S$^{94}$ is an arm S$^{95}$, which acts upon the check-pawl S$^{11}$, Fig. 1, resting under an extension of the feed-pawl S$^3$, so that when the push-rod acts to push the check-pawl it also acts upon the feed-pawl to hold it out, the feed-pawl S$^3$ permitting the feed-wheel S$^4$ and the matrix-carriage and weight to return to their first positions. When the push-rod S$^{10}$ is moved forward by the carriage-pin, a lug S$^{12}$ on the rod passes a projection on the longitudinal catch-rod S$^{13}$, which holds the check and feed pawls until released by the return of the carriage. The operator may release the push-rod through the rod S$^{13}$, connected to an arm S$^{14}$ on a shaft S$^{15}$, which carries a release-key S$^{16}$. During the return of the carriage the pin-wheels E E' are stopped by means of an arm S$^{17}$, actuated by the performing-lever L$^9$ and having a plunger S$^{18}$ adapted to lower the lock-out lever or rod E$^9$, Fig. 2. For this purpose there is provided on the upright shaft S$^{91}$ (to the arm S$^9$ of which the performing-lever L$^9$ is connected) the arm S$^{17}$, which is connected, through the link or plunger S$^{18}$, to a bell-crank lever S$^{19}$. This latter is adapted, as shown in Fig. 2, to act upon a collar S$^{20}$ on the lower end of the lock-out rod E$^9$ and pull the latter down against the spring E$^{10}$ to release the feed-pawl E$^8$ from the pin-wheel E'.

It will be understood that when the operator reaches the end of the composed line if such line is to be closed by hand, as at the end of a paragraph, the carriage-key K is depressed, which projects a carriage-pin on the pin row D$^9$, also operating the escapement, so that only the carriage-pin is projected on a single radial line and at the same time operating mechanism, which we will now describe, for returning the unit-composition register, for it will be understood that the unit-registry of the line just completed has been utilized and that it is necessary before composing a new line to return said register to its original position, as the registry mechanism has fulfilled its purpose.

The use of the hand-operated carriage-key K to close the line is intended only for short lines at the end of paragraphs, although it may be used for full lines, if desired. As hereinafter described, however, the machine is constructed to close the line automatically.

The shaft K$^2$ extends to the left-hand side of the machine and has an arm K$^5$, to which is attached the rod K$^6$, acting upon an arm K$^7$ of a spring-check pawl K$^8$, engaging with the ratchet-teeth I$^4$ of the dial I$^5$, Fig. 6. The rod K$^6$ also acts upon an arm of the feed-pawl I$^3$ to throw it out of gear with the registry-wheel when the check-pawl is thrown out. A weight K$^{10}$ is attached to a cord K$^9$, which passes around the hub of the registry-wheel I$^4$, and as soon as the operator presses upon the carriage-key K both pawls I$^3$ and K$^8$ are thrown out of gear with the ratchet-teeth of the registry-wheel I$^4$, said wheel will return, owing to the weight K$^{10}$, to its first position, and the pointer I$^6$ will be opposite the mark "O" of the dial. A stop-pin K$^{11}$ on the registry-wheel I$^4$ stops the wheel at said mark by coming into contact with a stop on the frame, Fig. 6.

*Automatic justifying mechanism.*—We will now describe the mechanism by which the composed line of matter is automatically justified and impressed into the matrix-sheet, referring particularly to Figs. 1, 25, and 26.

The space-key G⁸ rests upon an arm 12, projected from a transverse shaft 13, mounted in suitable bearings on the frame of the machine, so that on the depression of the said space-key it not only registers a space of three units, as previously described, but also sets a word-space pin on a special pin row in the same radial line, as described hereinafter, which acts to feed forward certain mechanism connected with the justifying apparatus.

On the shaft 13 is secured an arm 14, connected to a pin-striker 15 by a rod 16. This pin-striker acts upon pins on the sixth pin row D¹⁰ of the pin-wheel E. When the space-key is depressed, the pin-striker projects the pins in the pin row D¹⁰ into the path of the performing-lever 17, attached to the arm 18 on a shaft 19, on which are two arms 20 and 21. The arm 20 is connected to the arm 22 by a rod 23. The arm 22 is carried by a shaft 23*, mounted in suitable bearings, and this shaft has an arm 24, to which is attached a spring-pawl 25. On the movement of the performing-lever 17 in the direction of its arrow, Fig. 25, the pawl will be given a downward motion, and if the justifying-arm 26, the details of which will be described hereinafter, is moved in its path it will feed the arm forward one tooth.

The arm 21, mounted on the shaft 19, is connected by a rod 27 to an arm 28 on a shaft 29, and on this shaft is an arm 30, carrying a feed-pawl 31, which acts in the opposite direction to the feed-pawl 25—that is, it acts to return the justifying-arm 26 one tooth if the justifying-arm is in its path. The reasons for these movements will be set forth hereinafter. It will be sufficient to state here that the pawl 25 is the plus pawl and the pawl 31 is the minus pawl, so that in referring to Fig. 19 the matter on the first line being short of the standard of one hundred and forty-four units the plus pawl would be thrown into operation to bring the line up to one hundred and forty-four units by addition, whereas the third line, Fig. 19, which extends over the one hundred and forty-four units, would have to be contracted, and this is done through the operation of the minus pawl 31.

The justifying-arm 26 is mounted on a shaft 32, and projecting from the hub of this justifying-arm is an arm 33, which is of sufficient length to be in the path of a pin 34 on the back of the unit-register I⁵. (Shown by dotted lines in Figs. 25 and 26.) The shaft 32 is preferably in line with the shaft I² of the registering mechanism; but we prefer to make it independent of said shaft, as it is practically a stud rather than a shaft upon which the justifying-arm vibrates. The pin 34 is mounted so as to strike the arm 33 when the mechanism has registered one hundred and twenty-eight units or sixteen units short of the predetermined line, so that the arm 26 remains stationary in the position shown in Fig. 26 until the one hundred and twenty-eight units are registered. Then it commences to feed forward in the direction of its arrow, Fig. 26, the number of units to finish the word or a division of a word being composed. We would state that the justifying-arm carries sixteen pins 35, and has on its face two sets of rack-teeth 36 and 37, Figs. 27 and 30, for the pawls 31 and 25, respectively. Normally the pins are located in the central position by plates 38 and 39, the operation and construction of which will be described hereinafter.

On the right-hand end of the shaft 13 depends an arm 41, to which is attached a rod 42, connected to an arm 43 on a shaft K². On this shaft is hung the lever J⁶, which is attached to an arm J² on the shaft J³ and is connected through the rod J' to the escapement-lever J, Fig. 2.

Mounted on the left-hand end of the space-key shaft 13 is an arm 44, to which is attached a long pawl 45, acting upon the ratchet-wheel 46, attached to a drum 47, which is mounted upon the stud 48, Figs. 25 and 26. Upon this drum is wound a cord 49, which passes around rollers 50 and 51 and is first attached to the plate 39 and then passes to a drum 52 on a shaft 53, carrying a second drum 54, upon which is wound the cord 55, attached to the plate 38, as clearly shown in Figs. 25 and 26. These plates are each mounted on a bearing 56, Fig. 36, so as to move from and toward the pins, and the bearings are swiveled at 57 to the arm 26, so as to move in a radius to uncover more or less of the pins. The cords 49 and 55 are so run that on the forward feed of the pawl 45 the plates will be moved in opposite directions. The plates 38 and 39 will each uncover one pin at each stroke of the space-key, so that if there are five spaces in the line five pins will be uncovered by each plate, for a purpose described hereinafter. These devices constitute in the present construction of machine the word-space-registering mechanism.

We have now described the operation of the mechanism up to the time of the signal—that is, at the point of one hundred and twenty-eight units, which is near the completion of the line—and at this point mechanism which we will now proceed to describe is thrown into gear, so that on the next depression of the space-key the line is closed automatically. The essential feature whereby this result is accomplished consists in combining with the space-key and with line-closing devices and the register a device or mechanism whereby the space-key when the composed matter reaches what may be termed the "closing limits" of the line shall be connected with the line-closing devices automatically, so that the next operation of the space-key on the last word-space of the line shall at the same time act upon the line-closing mechanism. In the present instance there is on the shaft 13 of the space-key arm 12 an arm 40, which is normally out of gear with a sleeve 61, loose on said shaft, but connected with the line-closing devices. The arm 40 and the sleeve 61 can be coupled together at the proper time by a pivoted spring-lever 59, Fig. 25, controlled by the register.

It will be understood that the register has not only recorded the units of the word-spaces but also the units of the characters represented, and has now reached the signal-point, which is one hundred and twenty-eight units, and the pin 34 is about to engage with the arm 33, carried by the justifying-arm 26. On further movement of the registering mechanism the justifying-arm will be moved upon its center into the path of the pawl 25, and we would state here that after the justifying-arm has been moved sixteen units it will then pass beyond the path of the pawl 25 and into the path of the pawl 31. At the beginning of this movement the rod 58, Fig. 25, carried by the extension 59* of the justifying-arm, Fig. 26, is moved rearward, freeing the spring-lever 59, Fig. 25, one arm 60 of which passes under the arm 40, carried by the space-key shaft 13, so that on the next depression of the space-key lever the lever 59 will couple the arm 40 to the sleeve 61, to which the lever 59 is attached. This sleeve-actuating mechanism we will now describe.

We would state here that if in the case of a small word—such as the word "in" at the end of the first line of Fig. 19—where two spaces would occur within the sixteen-space limit, the lever 59 may be held out by hand, so that it will not close the line until the final space is reached. This we would state very rarely happens, and, in fact, the word "in" could be left out in this instance, as the last letter of the word "operations" is within the sixteen-unit limit; but in order to utilize the space that would be otherwise wasted the word "in" would in most cases be introduced, by preference, in that line rather than in the succeeding line.

The sleeve 61 has a lug 62, which acts upon a projection 63, carried on the hub mounted on the shaft 64, Fig. 25. This shaft 64 has an arm K¹², Figs. 1 and 25, connected by a link K¹³ to an arm K¹⁴, fastened to the shaft K², on which is mounted the carriage-key, so that when the shaft 64 is operated upon the clutching of the lever 59 to the arm 40 that movement will be transmitted to the shaft K² to automatically operate the line-closing pin in the pin-wheel E', the same as if the key K had been depressed by hand. The shaft 64 also has two arms 65, to which are hung, respectively, rods 66 67. The outer ends of these rods work within a frame 68, which is capable of being tilted so as to throw one or other of the rods into action for the purpose described hereinafter. The rod 66 acts upon an arm 69 on the lower part of a vertical shaft 71, Figs. 25, 26, 36, and 38, which carries at its upper part an upwardly-curved arm or lever 70, Fig. 26, acting upon an arm 72, projecting from the plate 38. The rod 67 is adapted to act upon an arm 73 on a vertical shaft 75, which carries at its upper end a downwardly-curved lever 74, adapted to act upon an arm 76, projecting from the plate 39, Fig. 36. If the rod 66 is thrown into line with the arm 69 of the shaft 71 by the tilting of the frame 68, the depression of a space-key when the arm 40 and the sleeve 61 are connected will cause the devices to operate the plate 38 to force it against the pins and throw out of line the pins which are at that time covered by the plate, leaving the uncovered pins in their normal positions indicating the number of spaces between words in the line.

The operation just described is simply a case where the line is short and units have to be added to make a full line of one hundred and forty-four units.

When the justifying-arm has reached the one hundred and forty-fourth unit-point, having moved sixteen units after the signal, the rock frame 68 is tilted so as to throw out of line the rod 66 and throw into line the rod 67. This is accomplished through the following mechanism: Projecting from the rear of the justifying-arm 26 is an arm 77, Fig. 26, which is connected to a rod 78, having a lug or projection 79, Fig. 38, which, as the rod rises, acts upon the projection 80 on the frame 68, tilting the frame so that the rod 67 will, on its forward movement, act on the arm 73 on the shaft 75 and cause the lever 74 to actuate the plate 39, depressing the covered pins carried by the justifying-arm, as shown in Figs. 26, 36, and 38. Depending from the frame 68 is an arm 81, through which passes a rod 82, adapted to engage with mechanism by which the feed-pawls 25 and 31 are thrown into or out of engagement with the justifying-arm. This rod 82 is attached to an arm 83, Fig. 26, on the shaft 64, Fig. 26, and has a T-shaped head 84, Fig. 35, one portion of the head engaging with the lug on a bolt 85 when the rod 82 is lowered and adapted to engage with the lug on the bolt 86 when the rod 82 is raised. These bolts are provided with springs, Fig. 35, for moving them forward, the T-shaped rod 82 acting to draw them back, so as to free them from their respective arms 87 and 88, which are carried by the vertical shafts 89 and 90, Fig. 35. The shaft 89 has an arm 91, which passes in front of the pawl 25 and holds it out of the path of the justifying-arm 26, and the rod 90 has an arm 92, which passes in front of the pawl 31 and holds it out of the path of the justifying-arm. Supposing the rod 82 to be in its lower position, with its head in engagement with the bolt 85, as shown in Figs. 28 and 35, if now the shaft 64 is rocked its arm 83 will draw the rod 82 to the left and with it the bolt 85, so as to carry the outer end of said bolt out of engagement with the arm 87 on the lower end of the upright shaft 89, so that the pawl 25, under the action of its spring, can then swing into engagement again with the rack 36, pushing the arm 91 on the upper end of the shaft 89 forward. When the rocking of the arm 68 carries the T-head of the rod 82 upward into engagement with the end of the bolt 86, a similar action will take place through the arm 88, shaft 90, and arm 92 to let the pawl 31 reëngage with the rack 37.

In order to justify the line automatically, the mechanism, set as previously described, must throw into engagement certain other mechanisms by which the units-space pins on the pin-wheel are either projected or retracted, being projected if the line is short and retracted if the line is too long, as will be readily understood.

We will now describe the mechanism by which positive motion is given to the parts to project or retract one or more of the units-space pins. On the shaft 19, which is acted upon by the performing-lever 17, moved by the projected pins of the word-space pin-row $D^{10}$, is an arm 93, Fig. 33, connected by a rod 94 to an arm 95 on the shaft 96, hung in suitable bearings, and on this shaft is a striker 97, which operates mechanism by which the units-space pins are projected so as to space out a short line. On the shaft 96 is another arm 98, connected by a rod 99 to an arm 100 on a shaft 101, carrying a striker 102. This shaft is also mounted in suitable bearings and the striker acts upon mechanism to retract the pins so as to shorten up the line of composition which was previously too long or more than one hundred and forty-four units. The striker 97 acts upon the rod 103, Fig. 29, when said rod is thrown into its path by mechanism described hereinafter. This rod is connected to an arm 104 on a vertical shaft 105, having an arm 106, connected to an arm 107 of a vertical shaft 108, Fig. 37, by a rod 109. At the pin-wheel E this vertical shaft has a striker-arm 110 at its upper end which acts to project the pins on the third pin-row $D^6$ of the wheel E, Fig. 37, the amount of projection, either a four or a five unit space, depending upon the projection of pins on the justifying-arm 26. It will be seen that one or two units can be added to the spaces in the line by the mechanism just described. The rod 103 passes through a bolt 111, Fig. 29, which is operated by the vertical shaft 89 through the medium of the arm 112, rod 113, and arm 114, shaft 115, and arm 116, as clearly shown in Fig. 35. The pins upon the justifying-arm 26 passes into the path of the bolt 111, and, as will be understood by the previous description, these pins can be projected from their normal central positions in one direction or the other by the plates 38 and 39 and the end of the bolt 111 is stepped, forming two surfaces 117 and 118. If the pins remain in their normal or central positions, the surface 118 will rest against the pins; but if the latter are projected the surface 117 will rest against them, thus making the movement of the bolt 111 shorter. The rod 103, which passes through the bolt 111, is also stepped, having two surfaces 119 and 120, Fig. 29, so that if the pins on the justifying-arm are left in their normal or central positions the movement of the bolts will bring the surface 120 in line with the striker 97, which will move the rod 103 forward one unit. This rod, acting through its mechanism, will project one of the pins on the third pin-row $D^6$ of the pin-wheel E one-half distance, indicating a four-unit space. It will be understood that the three-unit-space pin projected during the composition of matter to indicate the word-space is not retracted, as the four-unit pin being on the same radial line as a three-unit pin it will simply take the place of the three-unit pin; but it will be understood that if the line is too long the mechanism which we will now proceed to describe will not only project a one-unit-space pin, but will also retract the three-unit-space pins. The bolt 121, carrying the rod 122, is connected to the vertical shaft 90 through the arm 123, rod 124, arm 125, shaft 126, and arm 127, Fig. 35, so that on each movement of the shaft 90 the bolt 121 will be projected in a similar manner and for a similar purpose as the bolt 111. The rod 122 by the projection of the bolt 121 is thrown in the path of the striker 102, Fig. 32. The bolt 121 and the rod 122 have stepped striking-surfaces similar to the bolt 111 and 103. The rod 122 is attached to an arm 128, Figs. 32 and 25, on a vertical shaft 129, which has also an arm 130, to which is attached the rod 131, which is connected to an arm 132 of a sleeve 133, mounted upon the vertical shaft 108. This sleeve has a striking-lever 134 in line with the fifth pin-row $D^8$ of the pin-wheel E and acts to project a one-unit pin, as will be readily understood by referring to the diagram Fig. 18. The sleeve 133 has also an arm 135, attached to the arm 136 on an upright shaft 137, which is situated on the opposite side of the pin-wheel E, Figs. 25 and 37. This shaft has a striker-arm 138, which is in line with the fourth row of the pin-wheel E and is for the purpose of returning or retracting the pin, which was previously projected to the three-unit position, so as to reduce the number of units in the line when the line as composed is more than one hundred and forty-four units. Thus by the action of the two striking-levers 134 and 138 the space can be reduced from the three-unit space to the two-unit space or to a one-unit space.

As above described in the early part of this specification, a carriage-pin on the fifth pin-row $D^9$ of the wheel E' is set at the end of the composition of a line, automatically at the end of a normal line, or by hand at the end of a short line at the end of a paragraph. This indicates not only that the carriage must be returned, but also that the line is finished, so that the carriage-pin which has been previously set through the performing-lever $L^9$, Fig. 25, will move the rod $S^{10}$ in the direction of its arrow, throwing out the feed and check pawls $S^3$ and $S^{11}$ of a carriage-feed wheel $S^4$, allowing the catch-rod $S^{13}$ to fall back of the lug $S^{12}$ on the rod $S^{10}$, holding the pawls out of engagement until released by the return movement of the carriage. Connected to another arm on the same shaft as the rod $S^{10}$ are rods 139 and 140, which force the arms 87 and 88 of the vertical shafts 89 and 90 back of their retaining-pawls 85 and 86, Fig. 35. Thus these bolts hold the pawls 25 and 31 out of the path of the justifying-arm to allow it free return movement to its original position, the catch-rod $S^{13}$ holding these rods 139 and 140 in position until released by the return of the carriage.

Attached to the matrix-holder is a bar 141, having a head 142, which engages with an arm 143 during the latter portion of the return movement of the carriage, Figs. 1 and 25. This arm is mounted on a vertical shaft 144, the shaft having an arm 145, which is provided with a rod 146, having a head 147, which rests against one arm of a bell-crank lever 148. The other arm of this lever is connected to the catch-rod $S^{13}$, as clearly shown in Fig. 25, so that when the head 142 of the bar 141 strikes the lever 143 it releases the rods $S^{10}$, 139, and 140 from the control of the catch-bar $S^{13}$.

On the shaft 144 is a long arm carrying a rod 149, which passes through a box 150, Fig. 26, carried by an arm 151 on the justifying-arm 26, and between this box and the head 152 on the rod 149 is a spring 153. This rod when the carriage returns raises the justifying-arm to its original position, the spring 153 being placed between the head on the rod and the arm for the purpose of preventing a breakdown in case the operator by accident should close a long line of composition prior to the return of the carriage and the justifying-arms to their original positions at the commencement of a new line.

Attached to the short arm 154 of the vertical shaft 144 is a pull-rod 155, having a head 156, which rests back of an arm 157 on a vertical shaft 153, having at its upper end a two-armed lever 159, one arm resting back of an arm 160 on the shaft 71 and the other arm having a rod 161, provided with a head 162, which rests back of an arm 163 on the shaft 75, Fig. 25, and as these shafts control mechanism by which the pins on the justifying-arms are returned to their normal positions it will be understood that when the carriage returns to its original position to commence a new line it will draw upon the rod 155 and act upon the plates 38 and 39 in unison, forcing the pins into their central or normal positions ready for future justifying. Thus it will be seen that when the carriage reaches its forward position and has completed a line of matter certain mechanism is thrown out of gear and is held out until the carriage returns to its first position to commence a new line of matter, when the mechanism is again thrown into gear as the machine operates to impress a line of matter previously composed upon the pin-wheels by the operator, at the same time automatically justifying the line whether it be a short line or a long line.

Operation of the machine: We will now describe the operation of the machine, and in conclusion would say that it will be readily seen that if a character-key is depressed it will, through the composing mechanism, project the proper character-pins and the proper unit-space pins, and if necessary the vertical or the horizontal reverse-pins, or both, according to the location of the character, as fully described, but when the space-key is struck it will simply project the proper pin, indicating a normal space, which is in the present instance a three-unit pin, and will also project a special space-pin on the pin-row $D^{10}$, a special space-pin being projected at the end of each word, so as to indicate the number of spaces in a line. The special space-pins dictate when the justifying action is to take place and also act upon mechanism to justify the matter composed upon the pin-wheels immediately before it is produced upon the matrix-sheet. When the operator nears the end of the line, a signal is given. In the meantime, however, the unit-spaces of each character and of each word-space composed by the operator are registered upon the unit-composition register, and when the matter composed has reached, for instance, one hundred and twenty-eight units, which is the point at which the signal is given, the operator considers whether it is necessary to make a syllabic division of the word he is composing. This line may be closed with one hundred and forty-four units, or may be closed short of the one hundred and forty-four units, or may have more than one hundred and forty-four units, depending altogether upon the length of the word with which the line is closed. If the line ends short of one hundred and forty-four units, it will have to be lengthened by enlarging the word-spaces—that is, adding to the three-unit spaces between the words. The justifying-arm or the justifying mechanism is thrown into action when one hundred and twenty-eight units have been composed, so that when the line is closed at five units short of the one hundred and forty-four units the lower portion of the justifying-arm will be five units away from the center line, representing one hundred and forty-four units. The plates 38 and 39 at each depression of the space-key having uncovered the pins, as previously described, and as the line is short of one hundred and forty-four units the plate 39 remains stationary and the plate 38 is moved toward the justifying-arm, projecting the pins in its path, leaving seven pins unprojected, which represent the seven spaces of the line, as illustrated in Figs. 27 and 28. It will be seen that at the end of the line by the depression of the plate 38 there are left seven pins unprojected, which indicate the seven spaces in the composed line, in which corrections can be made for the purpose of justifying, and that the justifying-arm is five units away from the center line 144, and as the bolt 111 is placed sixteen units above the line 144 it will be opposite the fifth pin of the pin-row of the justifying-arm, indicating that there are five units to be added to the line to make it a standard line of one hundred and forty-four units, and there are seven spaces in which to add these five units, and it is evident that one unit added to each of five of the spaces will complete the line, and in the case of the described automatic justification these units are added, by preference, to the word-spaces at the beginning of the line. During each of the first five word-spaces the face 118 of the bolt 111 will come against one of the pins 35 in their normal central positions, as indicated in Figs. 28 and 29, so that each time the striker 97 will strike against the face 120 of the rod 103 and, through the rod 109, will move the normal word-space pin in the wheel E, so as to represent an additional unit. When the justifying-arm has, however, moved the fifth of the pins 35 beyond the range of the bolt 111, the latter will carry the rod 103 entirely out of range of the striker 97, and consequently in the two remaining word-spaces of the line no change of the spacing will be made. At the completion of the line four units will be found in each of the first five word-spaces, the two remaining spaces being undisturbed as three-unit spaces; but if there are more units in the error than word-spaces in the line then some of the word-spaces will have two units added to them, and in this instance some of the pins projected will stop the movement of the bolt 111, so that the striker 97 will act upon the face 119 of the rod 103 and set a five-unit pin in the place of the normal three-unit pin in the pin-wheel E. This movement will be described more particularly in reference to the excess error, which is an error in which there are more units than word-spaces. In composing the line should the operator decide to put in the additional word "which," as in the third line of Fig. 19, then the matter would run over the one hundred and forty-four units or standard line and the word-spaces would have to be contracted in order to produce a justified line. In the composition of this line the justifying-arm would pass through the plus justifying-section into the minus justifying-section a distance of thirteen units beyond the standard line of one hundred and forty-four units, as illustrated in Figs. 30 and 31, thus indicating that thirteen units are to be removed from the word-spaces in the line. As there are only eight word-spaces in the line, some of the corrections will have to be two-unit corrections and the balance one-unit corrections. Referring to Figs. 1, 31, and 32, it will be seen that the bolt 121 will first rest against the fully-projected pins, so as to deduct two units from each of the first five word-spaces of the line, leaving three word-spaces, in which one unit is to be deducted from each, thus making five corrections of two each and three corrections of one each, contracting the line to the normal length of one hundred and forty-four units, and in this instance utilizing all of the word-spaces for the justification of said line. It will be understood that as the carriage feeds forward the units of the represented characters remain the same, but the word-spaces are increased or decreased a number of units, according to the dictation of the justifying mechanism just described, so that all of the lines will have the same number of units, no matter whether the original matter composed by the operator was shorter or longer than the standard line of one hundred and forty-four units, and hence the column produced on this machine will be similar to a justified column obtained from movable types.

In describing this invention we have alluded to it as a "matrix-making machine;" but it will be understood that the mechanism may be used for making an impression not a matrix, and by the application of any of the well-known inking devices the machine can be used as a type-writer, the only difference being the depth of impression.

We claim as our invention—

1. A machine for typographic purposes, provided with means for measuring or registering the units in the line, in combination with mechanism controlled thereby, to automatically justify the line.

2. A machine for typographic purposes provided with unit-registering devices and word-space-registering devices, in combination with means controlled thereby, to automatically justify the line in the word-spaces.

3. A machine for typographic purposes, provided with means for making a preliminary representation and means for registering the units in the line, in combination with mechanism controlled by the unit-register, to automatically justify the line.

4. A machine for typographic purposes, provided with means for making a preliminary representation, devices for registering the units and the word-spaces, in combination with means controlled by the unit and word space registers to automatically justify the line in the word-spaces.

5. The combination with a matrix-feeding device, of unit-registering devices and means controlled from the said registering devices to vary the space-feed between words so as to justify the line.

6. The combination with a matrix-feeding device, of unit-registering and word-space-registering devices, and means controlled from said registering devices to vary the space-feed between words so as to justify the line.

7. A machine for typographic purposes having mechanism for representing the units and the word-spaces of a line, and mechanism for automatically justifying the line by altering the word-spaces so as to bring the represented line to the standard number of units.

8. The combination in a matrix-forming machine of means for representing the units and word-spaces of a line, with mechanism for automatically justifying the line by altering the word-spaces so as to bring the represented line to the standard number of units, and feeding and impressing mechanism for the final representation, substantially as described.

9. The combination of mechanism for representing the characters, the units, and the word-spaces in a line, with mechanism for registering the units and word-spaces and also the number of units the represented line is short of, or in excess of the standard line, and mechanism controlled by such registers to contract or to enlarge the represented word-spaces when the line is finally impressed, substantially as described.

10. The combination of devices for representing the characters, the units and the word-spaces of a line, and for registering the units and the number of word-spaces with mechanism controlled by the said registers to alter the representation of the units in the word-spaces, to justify the final representation, substantially as described.

11. In a machine for typographic purposes, the combination of a feed-carriage and automatic justifying mechanism with devices acted upon by the carriage on its return movement, to throw the justifying mechanism out of action, substantially as described.

12. The combination of mechanism for representing the characters, the units, and word-spaces of a line, with a justifying-arm, devices for throwing said arm into gear when the composition has neared the end of a line, pins on said justifying-arm, devices for moving said pins at the final word-space stroke of the line, thereby making a representation of the number of word-spaces in said line, and mechanism for making corrections in the represented word-spaces as dictated by the justifying-arm, substantially as described.

13. A typographic machine provided with mechanism for justifying a composed line of matter, in combination with devices for representing each normal word-space at the time of composition, and with means controlled by said representation, to automatically vary the width of said word-spaces after composition, whereby the final result is a justified line of matter.

14. A typographic machine provided with a keyboard, unit-registering and word-space-registering devices controlled from the keyboard, in combination with feed mechanism, and means controlled from said registering devices to automatically vary the space-feed between words, so as to justify the line.

15. The combination with a keyboard, feed mechanism and character-punches, with a representation device having movable pieces arrangeable from the keys for controlling the location of the punches and the normal feed, unit and word-space registering devices controlled from the keys, and means controlled by the registering devices to vary the space-feed between words, to justify the line.

16. A machine for typographic purposes provided with a keyboard for indicating the characters and normal word-spaces, with a representation device composed of independently-movable pieces which are first set from the keys for the entire selected line and then subsequently come into effect to control the final impression.

17. A typographic machine having a keyboard in combination with a preliminary-representation device composed of independently-movable pieces, some of which represent the character and others the unit-space thereof and which are first set for the entire selected line, and then subsequently come into effect to control the final representation.

18. The combination with a movable representation device, having a series of independently-movable pieces prearrangeable with reference to each other for the entire line, before the final impression, of a movable punch-carrier alinable at a common point of impression by said representation device, substantially as described.

19. The combination of a carriage-feed and a movable punch-carrier, with a representation device for automatically controlling the selection of the punches and spacing of the impression, the said representation device having a series of independently-movable pieces prearrangeable with reference to each other for the entire line before the final impression, and in sets, two of which determine the selection of any given punch, while a third controls the carriage-feed for spacing, substantially as described.

20. The combination in a matrix-forming machine, of the composing-action, the character-representing mechanism, the space-representing mechanism, unit composition-register for registering the number of units in the represented line, with impressing and feeding mechanism acted upon by the representing mechanism, substantially as described.

21. The combination in a matrix-forming machine of the following instrumentalities: first, the composing-action, second, the character-representing mechanism, third, the unit or the character-space representing mechanism, fourth, the word-space-representing mechanism, fifth, the unit composition-register, sixth, the character-locating mechanism, seventh, the impressing mechanism, eighth, the matrix-carrier, and ninth, the feeding mechanism, substantially as described.

22. The combination in a matrix-forming machine of the keys, the pin-carrier, pins adapted to said carriers, strikers acting to project the pins in said carrier, mechanism connecting the strikers with the keys, performing-rods acted upon by the projected pins of the pin-carrier, a carriage, feed mechanism for the carriage moved through the medium of one of the performing-rods, the character-punches, with mechanism between the character-punches and the performing-rods by which the proper punches are brought into line, with impressing mechanism, substantially as described.

23. The combination in a matrix-forming machine, of the composing-action, the character-representing mechanism, the unit-space-representing mechanism, the carriage, feeding mechanism for said carriage acted upon by the space-representing mechanism, character-punches, carrier therefor, and intervening mechanism between the carrier and character-representing mechanism by which the character-punches are located, substantially as specified.

24. The combination of the composing-action, the pin-wheel, pins carried by said wheel, mechanism for feeding the pin-wheel forward, said composing-action acting to project certain pins of the pin-wheel, the carriage, mechanism for feeding the carriage as dictated by the pins of the pin-wheel, character-punches and mechanism for locating the character-punches as dictated by the pins of the pin-wheel, substantially as described.

25. The combination of the composing-action, consisting of the keys, the strikers and connections between the keys and strikers, a shaft, two pin-wheels on said shaft, pins on each wheel so situated in respect to the strikers as to be projected thereby, the carriage, feeding mechanism therefor, character-punches, carrier therefor, mechanism between the character-feed and the pins, and mechanism between the character-punch carrier and the pins, substantially as described.

26. The combination of the composing-action, the character-representing mechanism, the space-representing mechanism, unit composition-register, the carriage-feeding mechanism therefor, with a power-driven shaft, cams thereon, switches on said cams, mechanism for shifting said switches, punches, a punch-carrier, with mechanism by which the punch-carrier is alined through the medium of the cams, substantially as specified.

27. The combination of the character-keys, transverse and longitudinal levers thereunder, two pin-wheels, mechanism for feeding the same, pins carried by said wheels, strikers for each wheel adapted to act upon the pins, the transverse levers being connected to one set of strikers and the longitudinal set of levers being connected to the opposite set of strikers, with impressing mechanism, substantially as described.

28. The combination of the character-keys, transverse and longitudinal levers under said keys, pin-carriers, pins, strikers for said pins, registering mechanism, the transverse levers being connected to one set of strikers and to mechanism for operating the register, and the longitudinal levers connected to the other set of strikers, impressing mechanism and feeding mechanism, substantially as described.

29. The combination of the keys, the strikers, mechanism between the keys and strikers, pin-wheels, pins thereon, one wheel carrying five rows of pins, two rows of which are character-locating pins and three rows character-unit-space pins, the other wheel carrying five rows of pins, four rows of which are character-locating pins, and one row the carriage-pin, with mechanism acted upon by the pins by which the characters are located, and the proper feed produced, substantially as described.

30. The combination of the keys, the strikers, mechanism between the keys and the strikers, the pin-wheel, pins thereon, mechanism for feeding said wheel, an escapement for controlling the radial position of the strikers, with impressing mechanism controlled by the pins of the pin-wheel, substantially as described.

31. The combination of the composing-action, the character-representing mechanism, the space-representing mechanism, two cams and a driven cam-shaft, a punch-carrier, punches thereon, gearing between the punch-carrier and one cam by which the vertical motion of the carrier is produced, and gearing between the punch-carrier and the other cam by which the horizontal motion is produced, with mechanism between the cams and the character-representing mechanism by which the proper movement is given to the punch-carrier, substantially as described.

32. The combination of the keyboard of a typographic machine with a punch-carrier and intermediate representation devices controlled by the keyboard and means whereby said representation devices control the location of the punch-carrier.

33. In a typographic machine, the combination of a keyboard and the punch-carrier normally located with its center at or near the impression-point, with representation mechanism controlling said punch-carrier to move it in different directions to bring different punches to the impression-point and return the carrier to its normal central position after each impression, substantially as described.

34. The combination of a constantly-moving impression-plunger with a movable punch-carrier normally located with its center at or near the impression-point, a device to automatically move said carrier in different directions to bring selected punches to the impression-point and to return the carrier to its normal central position, substantially as described.

35. The combination with the constantly-moving impression-plunger of a punch-carrier having a blank space at its center normally under said plunger and a group of punches surrounding said space, and means to move the said carrier in different directions to bring the punch to the impression-point and to return the carrier to its normal position, substantially as described.

36. In a typographic machine, a movable punch-carrier in combination with two rods, controlling the movement of said carrier in two different directions, a series of cams controlling the said rods, and means for engaging each rod with any selected cam of the series, each rod normally holding the carrier in the central position.

37. The combination of a movable punch-carrier with punch-locating cams, the middle of the carrier being normally held at the impression-point, and a representation device and means controlled by the representation device for selecting the cams to move the said carrier, substantially as described.

38. The combination of a movable punch-carrier, and power-driven punch-locating cams, with a representation device, and means controlled by the representation device for selecting the cams to operate the movable carrier, substantially as described.

39. The combination of a movable punch-carrier, and punch-locating cams controlling the movement of said carrier, with means for bringing one or other of the cams into operation to give the desired movement to the carrier, substantially as described.

40. In a typographic machine, a representation device consisting of a disk having a series of rows of movable pins frictionally held therein, certain pins representing letters and other pins representing the units corresponding to those letters, substantially as set forth.

41. In a typographic machine, the combination with a movable punch-carrier, and two sets of punch-locating cams, the carrier being normally held with its middle at the impression-point, a representation device, and means controlled by the representation device, for selecting the cams to move the movable punch-carrier, substantially as described.

42. In a typographic machine, the combination of a movable punch-carrier and two sets of punch-locating cams, the middle of the punch-carrier being normally at the impression-point, switches for bringing selected cams in use, and a representation device for controlling these switches, substantially as described.

43. In a typographic machine, a movable punch-carrier, in combination with two rods controlling the movement of said carrier in two different directions, a series of cams controlling said rods, means for engaging the rods with selected cams, and means for moving said cams, substantially as described.

44. In a typographic machine, a movable punch-carrier, in combination with two rods controlling said carrier to move it in different directions, a series of cams controlling each rod, the rods normally holding the carrier in a central position, means for engaging the rods with selected cams, and means for imparting motion to the latter, substantially as described.

45. In a typographic machine, the combination of a movable punch-carrier, with sets of cams controlling the same, switches for bringing any selected cam into use, and a representation device having movable pins for controlling the switches, substantially as described.

46. In a typographic machine, a representation device having rows of pins adapted to represent unit-spacing, in combination with a feeding device and rods controlling said feeding device and acted upon by the said spacing-pins, substantially as set forth.

47. In a typographic machine, a representation device carrying a series of pins, and means for imparting to each pin different extents of movements according to the representation desired.

48. The combination of a punch-carrier and movable frames in which the said carrier is mounted, carriage-feeding mechanism, a movable representation device having sets of movable pins arrangeable for the entire line previous to final impression, the sets of pins being adapted to be brought into effect in succession to aline the punches, and effect the feed, substantially as described.

49. The combination of a keyboard, a punch-carrier and a representation device provided with a series of independently-movable pieces arrangeable with reference to each other, and means whereby some of said pieces may be in use to automatically control the selection of a given line, while the others are being arranged from the keys for the selection of the punches for the next line.

50. A typographic machine provided with a preliminary-representation device combined with means for justifying the said preliminary representation.

51. A typographic machine having a preliminary-representation device, combined with means for changing normally-represented word-spaces into justified represented word-spaces.

52. A typographic machine having a preliminary-representation device, in combination with means for registering the units and the word-spaces in a composed line, and means for changing normally-represented word-spaces into justified represented word-spaces.

53. A typographic machine provided with a preliminary-representation device and unit-registering and word-space-registering devices, in combination with means automatically controlled thereby to justify the preliminary representation.

54. A typographic machine provided with means for making preliminary representation, said means containing arrangeable pieces in combination with means for registering the units thereof to govern the justification.

55. A typographic machine provided with means for making preliminary representation, said means containing arrangeable pieces in combination with means for registering the units and the word-spaces to govern the justification.

56. A typographic machine provided with means for making preliminary representation, said means containing arrangeable pieces in combination with means for registering the units and the word-spaces, and means for registering the number of units the represented line is short of or in excess of the standard length of line.

57. A typographic machine provided with means for automatically closing the line at a word-space.

58. A typographic machine provided with a representation device, in combination with means for automatically closing the line.

59. A typographic machine provided with a representation device, in combination with means for feeding the carriage and means for returning the carriage.

60. A typographic machine provided with a representation device, in combination with means for automatically feeding the carriage and means for automatically returning the carriage, and operating the line-feed.

61. A typographic machine provided with a unit-register in combination with justification mechanism and means for automatically closing the line.

62. A typographic machine provided with a representation device, in combination with justification mechanism and a unit-register and means for automatically closing the line.

63. A typographic machine provided with a space-key and a unit-register, in combination with line-closing devices and means whereby the operation of said space-key, within the closing limits of the line, automatically controls said line-closing devices.

64. A typographic machine provided with a space-key and a unit-register and a representation device, in combination with line-closing devices and means whereby the operation of said space-key within the closing limits of the line automatically controls the said line-closing devices.

65. A typographic machine provided with automatic-justifying mechanism, in combination with line-closing mechanism, and a space-key acting to indicate the word-spaces and adapted to act upon the mechanism to close the line, substantially as described.

66. A typographic machine provided with a register for the units, and a space-key, in combination with means for returning the register to a normal position by the action of the space-key within the closing limits of a line.

67. A typographic machine, provided with registers for the units and word-spaces, and a space-key in combination with means for returning the register to a normal position by the action of the space-key within the closing limits of a line.

In testimony whereof we have signed our names to this specification in the presence of two subscribing witnesses.

ISAAC RISLEY.
VINCENT F. LAKE.

Witnesses:
WILLIAM D. CONNER,
HENRY HOWSON.